United States Patent
Tateishi et al.

(10) Patent No.: US 8,038,780 B2
(45) Date of Patent: *Oct. 18, 2011

(54) INK COMPOSITION, INKJET RECORDING INK AND INKJET RECORDING METHOD

(75) Inventors: Keiichi Tateishi, Minami-Ashigara (JP); Yoshimitsu Arai, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 126 days.

This patent is subject to a terminal disclaimer.

(21) Appl. No.: 12/440,482

(22) PCT Filed: Oct. 4, 2007

(86) PCT No.: PCT/JP2007/069906
§ 371 (c)(1),
(2), (4) Date: Mar. 9, 2009

(87) PCT Pub. No.: WO2008/041782
PCT Pub. Date: Apr. 10, 2008

(65) Prior Publication Data
US 2010/0075040 A1 Mar. 25, 2010

(30) Foreign Application Priority Data
Oct. 4, 2006 (JP) .................... 2006-272761

(51) Int. Cl.
*C09D 11/02* (2006.01)
*B41J 2/01* (2006.01)
(52) U.S. Cl. .................. 106/31.49; 347/100
(58) Field of Classification Search ........... 106/31.49; 347/100
See application file for complete search history.

(56) References Cited

U.S. PATENT DOCUMENTS

| | | | |
|---|---|---|---|
| 5,425,805 A * | 6/1995 | Botros et al. | 106/31.43 |
| 6,156,111 A * | 12/2000 | Schwarz | 106/31.43 |
| 7,097,701 B2 * | 8/2006 | Tateishi et al. | 106/31.49 |
| 7,132,012 B2 * | 11/2006 | Tateishi et al. | 106/31.49 |
| 7,211,134 B2 * | 5/2007 | Tateishi et al. | 106/31.49 |
| 7,279,033 B2 * | 10/2007 | Yabuki et al. | 106/31.49 |
| 7,291,213 B2 * | 11/2007 | Ogawa et al. | 106/31.49 |
| 7,300,503 B2 * | 11/2007 | Tateishi et al. | 106/31.49 |
| 7,479,178 B2 * | 1/2009 | Dodge et al. | 106/31.49 |
| 7,708,820 B2 * | 5/2010 | Ogawa | 106/31.52 |
| 2005/0109236 A1 | 5/2005 | Yabuki et al. | |
| 2005/0142306 A1* | 6/2005 | Uhlir-Tsang et al. | 106/31.49 |
| 2006/0065156 A1 | 3/2006 | Ogawa et al. | |
| 2009/0269496 A1* | 10/2009 | Tateishi et al. | 427/256 |
| 2010/0028539 A1* | 2/2010 | Tateishi et al. | 106/31.49 |
| 2010/0075040 A1* | 3/2010 | Tateishi et al. | 106/31.49 |

FOREIGN PATENT DOCUMENTS

| | | |
|---|---|---|
| EP | 1 514 913 A2 | 3/2005 |
| EP | 1 630 212 A1 | 3/2006 |
| JP | 6-25575 A | 2/1994 |
| JP | 6-228476 A | 8/1994 |
| JP | 6-248212 A | 9/1994 |
| JP | 7-26178 A | 1/1995 |
| JP | 7-228810 A | 8/1995 |
| JP | 7-268261 A | 10/1995 |
| JP | 8-259865 A | 10/1996 |
| JP | 8-337745 A | 12/1996 |
| JP | 9-12946 A | 1/1997 |
| JP | 9-12949 A | 1/1997 |
| JP | 2005-105261 A | 4/2005 |
| JP | 2006-89730 A | 4/2006 |
| JP | 2006-89731 A | 4/2006 |
| JP | 2006-89732 A | 4/2006 |
| JP | 2006-89733 A | 4/2006 |

OTHER PUBLICATIONS

International Search Report (PCT/ISA/210) dated Dec. 18, 2007.
Written Opinion of The International Searching Authority (PCT/ISA/237) dated Dec. 18, 2007.

* cited by examiner

*Primary Examiner* — Helene Klemanski
(74) *Attorney, Agent, or Firm* — Buchanan Ingersoll & Rooney PC

(57) ABSTRACT

An ink composition includes a colorant represented by the following formula (I); water; a guanidine-based compound; and a colorless water-soluble planar compound having more than ten delocalized π-electrons within one molecule:

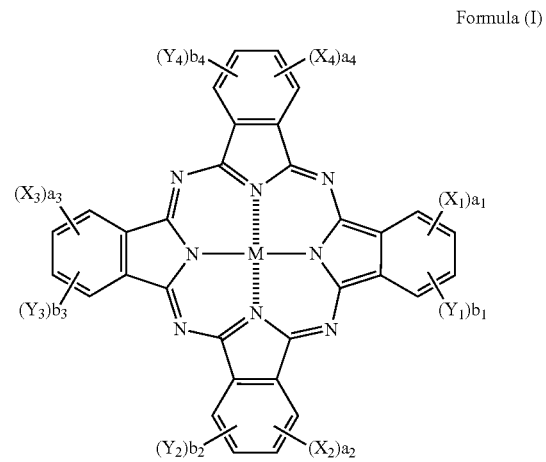

Formula (I)

wherein the symbols in the formula (I) are defined in the specification.

25 Claims, No Drawings

INK COMPOSITION, INKJET RECORDING INK AND INKJET RECORDING METHOD

TECHNICAL FIELD

The present invention relates to an ink composition containing a water-soluble aromatic compound having an excellent effect on the improvement of the bronze phenomenon of the recorded image and a guanidine-based compound having an excellent effect on the storage durability, particularly, gas resistance, of the recorded image, an inkjet recording ink, an inkjet recording method, and a method for improving both the bronze phenomenon of the inkjet recorded image and the storage stability of the inkjet recorded image at the same time.

BACKGROUND ART

The inkjet recording method is abruptly overspread and still making a progress, because the material cost is low, high-speed recording can be performed, noises are less generated at the recording and color recording is easy. The inkjet recording method includes a continuous system of continuously flying a liquid droplet and an on-demand system of flying a liquid droplet according to image information signals, and the ejection system therefor includes a system of ejecting a liquid droplet by applying a pressure from a piezoelectric element, a system of ejecting a liquid droplet by generating a bubble in the ink under heat, a system using an ultrasonic wave, and a system of suctioning and ejecting a liquid droplet by an electrostatic force. As for the inkjet recording ink, an aqueous ink, an oil-based ink or a solid (fusion-type) ink is used.

The coloring matter used in such an inkjet recording ink is required to exhibit good solubility in a solvent such as water, enable high-density recording, provide a good color hue, be fast to light, heat and active gases in the environment (for example, an oxidative gas such as NOx and ozone, and SOx) and highly resistant against water and chemicals, ensure good fixing property and less blurring on an image-receiving material, give an ink having excellent storability, have high purity and no toxicity and be available at a low cost.

Above all, the coloring matter is strongly demanded to be fast to light, humidity and heat, particularly, at the printing on an image-receiving material having an ink-receiving layer containing a porous white inorganic pigment particle, to be fast to oxidative gases such as ozone in the environment and excellent in the water resistance.

On the other hand, in the case where a recorded image having a high optical density is formed, it is known that there arises a problem that as the image is dried, the coloring matter crystal deposits on the surface of the recording material and the recorded image reflects light to cause a so-called bronze phenomenon of emitting metallic gloss. This phenomenon tends to readily occur when the water solubility of the coloring matter is decreased so as to improve water resistance, light resistance or gas resistance or a hydrogen bonding group is introduced into the coloring matter structure. The generation of the bronze phenomenon not only incurs decrease in the optical density of the recorded image but also causes the recorded image to have a color hue greatly different from the desired color hue or lose the transparency. Therefore, it is one of important performances required of the inkjet ink to prevent the bronze phenomenon.

As regards the method for preventing the bronze phenomenon, there have been heretofore known a method of adding a specific nitrogen-containing compound (see, for example, JP-A-6-25575 (the term "JP-A" as used herein means an "unexamined published Japanese patent application"), JP-A-6-228476, JP-A-6-248212, JP-A-7-228810, JP-A-7-268261, JP-A-9-12946 and JP-A-9-12949), a method of adding a specific heterocyclic compound (see, JP-A-8-259865), a method of adding a specific titanium compound (see, JP-A-8-337745), a method of adding an alkali metal ion (see, JP-A-7-26178), and the like. The bronze phenomenon may be prevented from occurring by adding such an additive, but the amount of the additive added may be increased because of its insufficient effect or the additive may decrease various performances of the ink and the quality of the recorded image, such as deterioration in the storage stability. For example, as described in JP-A-8-259865, when an alkanolamine is added to the ink, the bronze phenomenon can be prevented, but by the addition only in a small amount, the pH of the ink increases to 11 or more and the high pH ink not only adversely affects nozzles but also lacks in safety on erroneously contacting with a human body and moreover, decreases the printing grade or water resistance of the recorded image.

In this way, various effects can be obtained by using an additive, but it is difficult to use conventional additives while maintaining various performances. Particularly, in the case where the solubility and aggregating property of the coloring matter need to be taken account of, selection of the kind and amount of the additive is difficult. Also, in using an ionic additive, the effect thereof on the counter ion must also be taken into consideration. Accordingly, a molecular design of the additive by an unconventional new idea and a substantial bronze phenomenon-inhibiting method using the additive are being demanded.

As regards the method for improving such bronze gloss of the recorded image, there are disclosed a method of using a specific additive in combination (see, for example, JP-A-2005-105261), and a method for adding a specific additive in combination for improving the storage stability (particularly, light fastness and ozone gas fastness) of the recorded image (see, for example, JP-A-2006-89730, JP-A-2006-89731, JP-A-2006-89732 and JP-A-2006-89733). However, a method satisfying both the improvement of bronze phenomenon of the recorded image and the improvement of preservability of the recorded image at the same time in a high improvement level has not yet been found, and a method for more improvement is being demanded at present.

DISCLOSURE OF THE INVENTION

The objects of the present invention are (1) to provide a novel ink having absorption properties ensuring excellent color reproduction and at the same time, having sufficiently high fastness to light, heat, humidity and active gas in the environment;

(2) to provide an ink of giving a colored image or colored material excellent in the color hue and fastness, for example, a printing ink composition used in the inkjet recording;

(3) to provide an inkjet recording ink and an inkjet recording method, which can form an image assured of good color hue by the use of a phthalocyanine compound derivative having a specific structure as the colorant, high fastness to light and active gas in the environment, particularly ozone gas, and excellent water resistance and free of generation of a bronze phenomenon; and (4) to provide a method satisfying the improvement of both bronze phenomenon and preservability of the image recorded matter at the same time in a high improvement level by using the above-described inkjet recording method.

The objects of the present are attained by the following inventions.

<1> An ink composition comprising:

a colorant represented by the following formula (I);

water;

a guanidine-based compound; and a colorless water-soluble planar compound having more than ten delocalized π-electrons within one molecule:

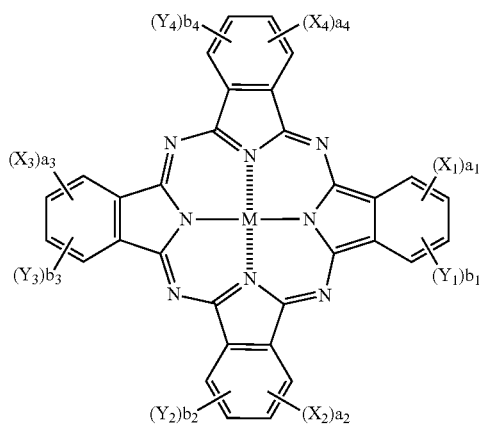

Formula (I)

wherein

M represents a hydrogen atom, a metal atom, an oxide thereof, a hydroxide thereof or a halide thereof;

each of $X_1$, $X_2$, $X_3$ and $X_4$ represents a substituent selected from the group consisting of —SO—$R_1$, —$SO_2$—$R_1$, —$SO_2NR_2R_3$, —$CONR_2R_3$, —$CO_2$—$R_1$, —CO—$R_1$, a sulfo group and a salt thereof, a carboxyl group and a salt thereof, and a phosphono group and a salt thereof;

$R_1$ represents a substituted or unsubstituted alkyl group, a substituted or unsubstituted aryl group, or a substituted or unsubstituted heterocyclic group;

$R_2$ represents a hydrogen atom, a substituted or unsubstituted alkyl group, a substituted or unsubstituted aryl group, or a substituted or unsubstituted heterocyclic group;

$R_3$ represents a hydrogen atom, a substituted or unsubstituted alkyl group, a substituted or unsubstituted aryl group, or a substituted or unsubstituted heterocyclic group;

each of $Y_1$, $Y_2$, $Y_3$ and $Y_4$ represents a hydrogen atom or a monovalent substituent which may further have a substituent; and $a_1$ to $a_4$ and $b_1$ to $b_4$ represent the numbers of $X_1$ to $X_4$ and $Y_1$ to $Y_4$, respectively, and each of $a_1$ to $a_4$ and $b_1$ to $b_4$ represents an integer of 0 to 4, provided that at least one of $X_1$, $X_2$, $X_3$, $X_4$, $Y_1$, $Y_2$, $Y_3$ and $Y_4$ is itself an ionic hydrophilic group or has an ionic hydrophilic group as a substituent; and at least one of $a_1$ to $a_4$ is not 0.

<2> The ink composition as described in <1>, wherein the colorant represented by the formula (I) is represented by the following formula (II):

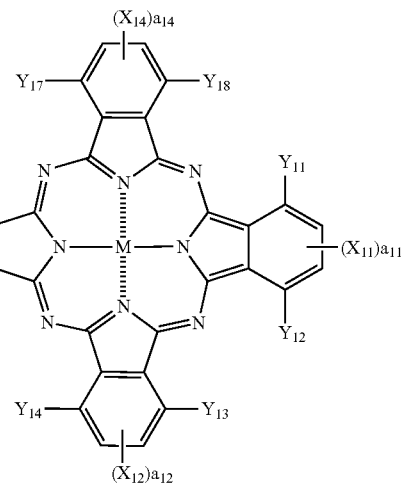

Formula (II)

wherein

M has the same meaning as M in the formula (I);

each of $X_{11}$, $X_{12}$, $X_{13}$ and $X_{14}$ represents a substituent selected from the group consisting of —$SO_2NR_2R_3$, —$CONR_2R_3$, —$CO_2$—$R_1$, —CO—$R_1$, a sulfo group and a salt thereof, a carboxyl group and a salt thereof, and a phosphono group and a salt thereof;

$R_1$, $R_2$ and $R_3$ have the same meaning as $R_1$, $R_2$ or $R_3$ in the formula (I), respectively;

each of $Y_{11}$, $Y_{12}$, $Y_{13}$, $Y_{14}$, $Y_{15}$, $Y_{16}$, $Y_{17}$ and $Y_{18}$ represents a hydrogen atom or a monovalent substituent which may further have a substituent; and $a_{11}$, $a_{12}$, $a_{13}$ and $a_{14}$ represent the numbers of $X_{11}$, $X_{12}$, $X_{13}$ and $X_{14}$, respectively, and each of $a_{11}$, $a_{12}$, $a_{13}$ and $a_{14}$ represents an integer of 0 to 2, provided that at least one of $X_{11}$, $X_{12}$, $X_{13}$, $X_{14}$, $Y_{11}$, $Y_{12}$, $Y_{13}$, $Y_{14}$, $Y_{15}$, $Y_{16}$, $Y_{17}$ and $Y_{18}$ is itself an ionic hydrophilic group or has an ionic hydrophilic group as a substituent; and at least one of $a_{11}$ to $a_{14}$ is not 0.

<3> The ink composition as described in <1> or <2>, wherein the colorant represented by the formula (II) is represented by the following formula (III):

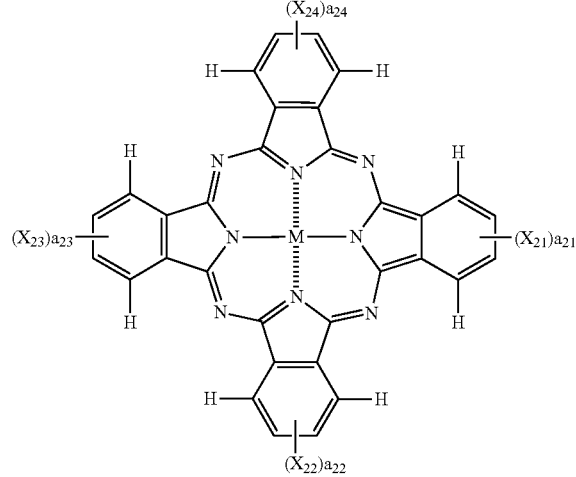

Formula (III)

wherein

M has the same meaning as M in the formula (II);

each of $X_{21}$, $X_{22}$, $X_{23}$ and $X_{24}$ represents a substituent selected from the group consisting of $-SO_2NR_2R_3$, $-CONR_2R_3$, $-CO_2-R_1$, $-CO-R_1$, a sulfo group and a salt thereof, a carboxyl group and a salt thereof, and a phosphono group and a salt thereof;

$R_1$, $R_2$ and $R_3$ have the same meaning as $R_1$, $R_2$ or $R_3$ in the formula (II) respectively; and $a_{21}$, $a_{22}$, $a_{23}$ and $a_{24}$ represent the numbers of $X_{21}$, $X_{22}$, $X_{23}$ and $X_{24}$, respectively, and each of $a_{21}$, $a_{22}$, $a_{23}$ and $a_{24}$ represents an integer of 0 to 2, provided that at least one of $X_{21}$, $X_{22}$, $X_{23}$ and $X_{24}$ is itself an ionic hydrophilic group or has an ionic hydrophilic group as a substituent; and at least one of $a_{21}$ to $a_{24}$ is not 0.

<4> The ink composition as described in any one of <1> to <3>, wherein the colorant represented by the formula (III) is represented by the following formula (IV):

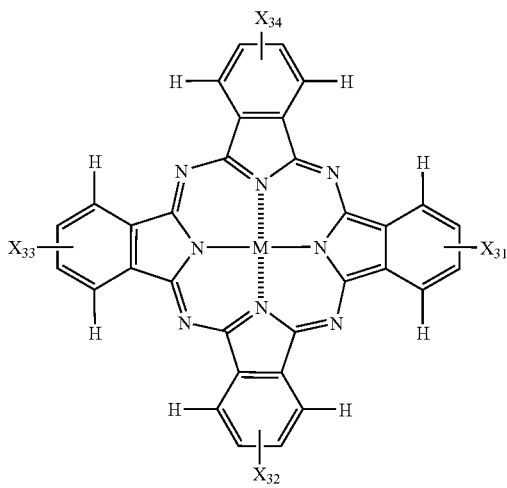

Formula (IV)

wherein

M has the same meaning as M in the formula (III);

each of $X_{31}$, $X_{32}$, $X_{33}$ and $X_{34}$ represents a substituent selected from the group consisting of $-SO_2NR_2R_3$, $-CONR_2R_3$, $-CO_2-R_1$, $-CO-R_1$, a sulfo group and a salt thereof, a carboxyl group and a salt thereof, and a phosphono group and a salt thereof; and $R_1$, $R_2$ and $R_3$ have the same meaning as $R_1$, $R_2$ or $R_3$ in the formula (II), provided that at least one of $X_{31}$, $X_{32}$, $X_{33}$ and $X_{34}$ is itself an ionic hydrophilic group or has an ionic hydrophilic group as a substituent.

<5> The ink composition as described in <4>, wherein each of $X_{31}$, $X_{32}$, $X_{33}$ and $X_{34}$ each independently represents a substituent selected from the group consisting of $-SO_2NH_2$, $-SO_2NR_2R_3$, a sulfo group and a salt thereof, provided that at least one of $R_2$ and $R_3$ is not a hydrogen atom.

<6> The ink composition as described in <4> or <5>, wherein at least one of $X_{31}$, $X_{32}$, $X_{33}$ and $X_{34}$ is $-SO_2NH_2$; and at least one of $X_{31}$, $X_{32}$, $X_{33}$ and $X_{34}$ is $-SO_2NR_2R_3$;

provided that at least one of $R_2$ and $R_3$ is not a hydrogen atom.

<7> The ink composition as described in any one of <4> to <6>, wherein at least one of $X_{31}$, $X_{32}$, $X_{33}$ and $X_{34}$ is $-SO_2NH_2$;

at least one of $X_{31}$, $X_{32}$, $X_{33}$ and $X_{34}$ is $-SO_2NR_2R_3$; and at least one of $X_{31}$, $X_{32}$, $X_{33}$ and $X_{34}$ is a sulfo group or a salt thereof, provided that at least one of $R_2$ and $R_3$ is not a hydrogen atom.

<8> The ink composition as described in any one of <1> to <7>, wherein at least one ionic hydrophilic group in the colorant represented by the formula (I), (II), (III) or (IV) is a sulfo group or a salt thereof.

<9> The ink composition as described in any one of <1> to <8>, wherein at least one ionic hydrophilic group in the colorant represented by the formula (I), (II), (III) or (IV) is a lithium salt of sulfo group, provided that all counter cations of the salts of sulfo group are not necessarily a lithium ion.

<10> The ink composition as described in any one of <1> to <9>, wherein

50% or more of counter cations of all the ionic hydrophilic groups in the colorant represented by the formula (I), (II), (III) or (IV) are a lithium cation.

<11> The ink composition as described in any one of <1> to <10>, wherein

50% or more of all the ionic hydrophilic groups in the colorant represented by formula (I), (II), (III) or (IV) are a lithium salt of sulfo group, provided that all counter cations of the salts of sulfo group are not necessarily a lithium ion.

<12> The ink composition as described in any one of <1> to <11>, further comprising:

at least one phthalocyanine dye represented by the following formula (V):

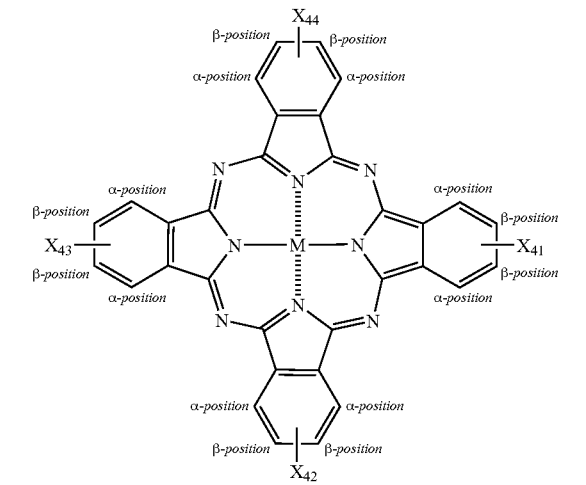

Formula (V)

wherein

M has the same meaning as M in the formula (I);

each of $X_{41}$, $X_{42}$, $X_{43}$ and $X_{44}$ represents a substituent selected from the group consisting of $-SO_2NR_2R_3$, $-CONR_2R_3$, $-CO_2-R_1$, $-CO-R_1$, a sulfo group and a salt thereof, a carboxyl group and a salt thereof, and a phosphono group and a salt thereof; and $R_1$, $R_2$ and $R_3$ have the same meaning as $R_1$, $R_2$ or $R_3$ in the formula (I), respectively, provided that at least one of $X_{41}$, $X_{42}$, $X_{43}$ and $X_{44}$ is itself an ionic hydrophilic group or has an ionic hydrophilic group as a substituent.

<13> The ink composition as described in <12>, wherein at least one of $X_{41}$, $X_{42}$, $X_{43}$ and $X_{44}$ represents an —$SO_2NH_2$ group;

at least one of $X_{41}$, $X_{42}$, $X_{43}$ and $X_{44}$ represents an —$SO_2NR_2R_3$ group; and at least one of $X_{41}$, $X_{42}$, $X_{43}$ and $X_{44}$ represents a sulfo group or a salt thereof.

<14> The ink composition as described in any one of <1> to <13>, wherein the water-soluble planar compound has at least two aromatic rings.

<15> The ink composition as described in any one of <1> to <14>, wherein the water-soluble planar compound has no fluorescence, and has 350 nm or less of λmax and 10,000 or less of molar absorption coefficient, wherein λmax represents a wavelength of the absorption peak having the longest wavelength.

<16> The ink composition as described in any one of <1> to <15>, wherein the water-soluble planar compound has a sulfo group.

<17> The ink composition as described in any one of <1> to <16>, wherein the guanidine-based compound is represented by the following formula (1):

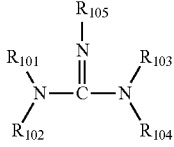

Formula (1)

$R_{101}$, $R_{102}$, $R_{103}$ and $R_{104}$ each independently represents a hydrogen atom, a substituted or unsubstituted alkyl group, a substituted or unsubstituted alkoxy group, a substituted or unsubstituted aryl group, a substituted or unsubstituted heterocyclic group, or substituted or unsubstituted an amino group; and $R_{105}$ represents a hydrogen atom, a substituted or unsubstituted alkyl group, a substituted or unsubstituted alkoxy group, a substituted or unsubstituted aryl group, or a substituted or unsubstituted heterocyclic group.

<18> The ink composition as described in any one of <1> to <17>, wherein the guanidine-based compound is in an amount of 0.1 to 10 mass % based on the ink composition.

<19> The ink composition as described in any one of <1> to <18>, further comprising:

a surfactant.

<20> The ink composition as described in <19>, wherein the surfactant is in an amount of 0.05 to 50 g/liter based on the ink composition.

<21> The ink composition as described in <19> or <20>, wherein the surfactant is a nonionic surfactant.

<22> The ink composition as described in <21>, wherein the nonionic surfactant is an acetylene glycol-based surfactant.

<23> The ink composition as described in any one of <1> to <22>, further comprising:

an antiseptic.

<24> An inkjet recording ink prepared by using the ink composition as described in any one of <1> to <23>.

<25> An inkjet recording method using the inkjet recording ink as described in <24>.

BEST MODE FOR CARRYING OUT THE INVENTION

The present invention is based on the finding that when a colorant having a specific structure represented by formulae (I) to (IV) and a specific compound are present together, the preservability, particularly, ozone resistance, of an image can be remarkably enhanced. As well as enhancement of the ozone resistance, an image quality free of bronze gloss, bleeding or beading can also be ensured.

The constituent elements of the present invention are described in detail below.

(Colorant Represented by Formula (I), (II), (III) or (IV))

The colorant for use in the present invention is a phthalocyanine derivative having a specific structure (a specific number of specific substituents are introduced into specific substitution sites), and it has been found that by virtue of using this colorant, the preservability, particularly, ozone gas resistant fastness, of the recorded image can be greatly enhanced.

That is, the phthalocyanine derivative having a specific structure, which is the colorant for use in the present invention represented by formula (I), is greatly characterized by controlling the position of the substituent at the molecular synthesis to have specific substituents ($X_1$, $X_2$, $X_3$ and $X_4$) in the benzene ring of the phthalocyanine skeleton, particularly, to have these substituents only at the β-position.

The phthalocyanine derivative usually has a substituent such as soluble group randomly at the α-position (to describe by referring to the phthalocyanine molecule of the present invention, this position includes, for example, the substitution sites of $Y_{11}$, $Y_{12}$, $Y_{13}$, $Y_{14}$, $Y_{15}$, $Y_{16}$, $Y_{17}$ and $Y_{18}$ in formula (II)) and the β-position (to described by referring to the phthalocyanine molecule of the present invention, this position includes, for example, the substitution sites of $X_{11}$, $X_{12}$, $X_{13}$ and $X_{14}$ to four benzene rings of the phthalocyanine molecule as the mother nucleus) of four benzene rings of the phthalocyanine skeleton.

The phthalocyanine derivative as the colorant for use in the present invention preferably has, as described above, a specific number of specific substituents only at the β-position, and this construction is considered to provide an effect of promoting the aggregation of phthalocyanine molecules and at the same time, enhancing the oxidation potential, thereby ensuring excellent weather resistance (light fastness, gas resistance).

The colorant for use in the present invention is preferably a phthalocyanine derivative having a structure represented by the following formula (I).

The colorant represented by formula (I) for use in the present invention includes a sole phthalocyanine derivative (dye) represented by formula (I), a salt or hydrate thereof, and a dye mixture or a salt or hydrate thereof. The salts or hydrates may be used individually or as a mixture in the colorant.

Formual (I)

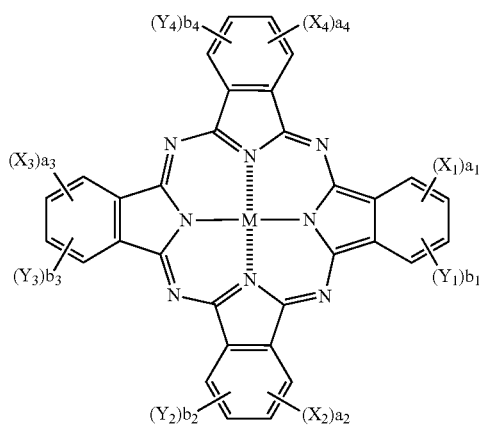

In formula (I), M represents a hydrogen atom, a metal element, or its oxide, hydroxide or halide.

Examples of the metal atom include Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi.

Examples of the oxide include VO and GeO.

Examples of the hydroxide include $Si(OH)_2$, $Cr(OH)_2$ and $Sn(OH)_2$.

Examples of the halide include AlCl, $SiCl_2$, VCl, $VCl_2$, VOCl, FeCl, GaCl and ZrCl.

Above all, M is preferably Cu, Ni, Zn, or Al, and most preferably Cu.

In formula (I), $X_1$, $X_2$, $X_3$ and $X_4$ each independently represents a substituent selected from —SO—$R_1$, —$SO_2$—$R_1$, —$SO_2NR_2R_3$, —$CONR_2R_3$, —$CO_2$—$R_1$, —CO—$R_1$, a sulfo group and a salt thereof, a carboxyl group and a salt thereof, and a phosphono group and a salt thereof.

$X_1$, $X_2$, $X_3$ and $X_4$ each is independently preferably —SO—$R_1$, —$SO_2$—$R_1$, —$SO_2NR_2R_3$, —$CONR_2R_3$, —$CO_2$—$R_1$, —CO—$R_1$, a sulfo group or a salt thereof, more preferably —SO—$R_1$, —$SO_2NR_2R_3$, a sulfo group or a salt thereof, and most preferably —$SO_2NR_2R_3$, a sulfo group or a salt thereof.

$R_1$ represents a substituted or unsubstituted alkyl group, a substituted or unsubstituted aryl group, or a substituted or unsubstituted heterocyclic group. $R_2$ represents a hydrogen atom, a substituted or unsubstituted alkyl group, a substituted or unsubstituted aryl group, or a substituted or unsubstituted heterocyclic group. $R_3$ represents a hydrogen atom, a substituted or unsubstituted alkyl group, a substituted or unsubstituted aryl group, or a substituted or unsubstituted heterocyclic group.

$Y_1$, $Y_2$, $Y_3$ and $Y_4$ each independently represents a hydrogen atom or a monovalent substituent, and the monovalent substituent may further have a substituent.

Here, at least one of $X_1$, $X_2$, $X_3$, $X_4$, $Y_1$, $Y_2$, $Y_3$ and $Y_4$ is itself an ionic hydrophilic group or has an ionic hydrophilic group as a substituent.

Examples of the ionic hydrophilic group include a sulfo group, a carboxyl group, a phosphono group and a quaternary ammonium group. Among these, a carboxyl group, a phosphono group and a sulfo group are preferred, and a carboxyl group and a sulfo group are more preferred. The carboxyl group, phosphono group and sulfo group each may be in the state of a salt. Examples of the counter ion forming the salt include an ammonium ion, an alkali metal ion (e.g., lithium ion, sodium ion, potassium ion) and an organic cation (e.g., tetramethylammonium ion, tetramethyl-guanidium ion, tetramethylphosphonium ion). Among these counter ions, an alkali metal salt is preferred, and a lithium salt of sulfo group is more preferred, because the solubility of dye and the stability of ink are enhanced.

The counter ion of the sulfo group which is a preferred example of the ionic hydrophilic group contained in the phthalocyanine compound as the colorant represented by formula (I) of the present invention, is most preferably a lithium ion.

The counter cations need not be entirely a lithium ion, but a lithium ion must be a counter cation occupying substantially a highest abundance ratio. Under such an abundance ratio condition, a hydrogen ion, an alkali metal ion (e.g., sodium ion, potassium ion), an alkaline earth metal ion (e.g., magnesium ion, calcium ion), a quaternary ammonium ion, a quaternary phosphonium ion, a sulfonium ion or the like can be contained as the counter cation.

As for the kind and proportion of the counter cation in the above-described phthalocyanine compound, analysis methods and elements are described in *Shin Jikken Kagaku Koza* 9, *Bunseki Kagaku* (*Lecture 9 of New Experiment Chemistry, Analysis Chemistry*), compiled by Nippon Kagaku Kai, Maruzen (1977) and *Dai 4 Han, Jikken Kagaku Koza* 15, *Bunseki* (*4th Edition, Lecture 15 of Experiment Chemistry, Analysis*), compiled by Nippon Kagaku Kai, Maruzen (1991). By referring to these publications, the analysis method can be selected and the analysis and determination can be performed. In particular, the determination can be easily performed by an analysis method such as ion chromatography, atomic absorption method or induction coupled plasma emission analysis method (ICP).

The amount of the lithium ion in the phthalocyanine compound is 50% or more, preferably 60% or more, more preferably 80% or more, still more preferably 90% or more, with a preferred upper limit of 100%, based on the entire counter ion.

The method for obtaining the phthalocyanine compound of the present invention having a lithium ion as the counter cation may be any method. Examples thereof include (1) a method of converting the counter cation into a lithium ion from a different cation by using an ion exchange resin, (2) a method by acid or salt deposition from a system containing a lithium ion, (3) a method of forming phthalocyanine by using a raw material or synthesis intermediate where the counter cation is a lithium ion, (4) a method of introducing an ionic hydrophilic group through conversion of the functional group of a phthalocyanine compound by using a reacting agent where the counter cation is lithium ion, and (5) a method of synthesizing a compound where the counter cation for the ionic hydrophilic group on a phthalocyanine compound is silver ion, reacting the compound with a lithium halide solution, and removing the precipitated silver halide, thereby changing the counter cation to a lithium ion.

$a_1$ to $a_4$ and $b_1$ to $b_4$ represent the number of substituents $X_1$ to $X_4$ and $Y_1$ to $Y_4$, respectively, and $a_1$ to $a_4$ and $b_1$ to $b_4$ each independently represents an integer of 0 to 4, provided that $a_1$ to $a_4$ all are not 0 at the same time.

Also, in the phthalocyanine compound represented by formula (I), Pc (phthalocyanine ring) may form a dimer (for example, Pc-M-L-M-Pc) or a trimer through L (divalent linking group), where the plurality of M's may be the same or different.

The divalent linking group represented by L is preferably an oxy group —O—, a thio group —S—, a carbonyl group —CO—, a sulfonyl group —$SO_2$—, an imino group (—NH—), a methylene group (—$CH_2$—) or a group formed by a combination thereof.

$R_1$ is preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group.

$R_2$ is preferably a hydrogen atom, a substituted or unsubstituted alkyl group, a substituted or unsubstituted aryl group or a substituted or unsubstituted heterocyclic group, more preferably a hydrogen atom, a substituted alkyl group or a substituted aryl group, still more preferably a hydrogen atom or a substituted alkyl group, and most preferably a hydrogen atom.

$R_3$ is preferably a hydrogen atom, a substituted or unsubstituted alkyl group, a substituted or unsubstituted aryl group or a substituted or unsubstituted heterocyclic group, more preferably a hydrogen atom, a substituted alkyl group, a substituted aryl group or a substituted heterocyclic group, still more preferably a substituted alkyl group or a substituted aryl group, and most preferably a substituted alkyl group.

The substituted or unsubstituted alkyl group represented by $R_1$, $R_2$ and $R_3$ is preferably an alkyl group having a carbon number of 1 to 12. The alkyl group is more preferably a branched alkyl group, still more preferably an alkyl group having an asymmetric carbon (use in the racemic form), because the solubility of dye and the stability of ink are enhanced. The alkyl group includes a cycloalkyl group, an alkenyl group and an aralkyl group.

Examples of the substituent are the same as those of the substituent described later when $R_1$, $R_2$, $R_3$, $Y_1$, $Y_2$, $Y_3$ and $Y_4$ each may further have a substituent. In particular, a hydroxyl group, an ether group, an ester group, a cyano group, an amido group and a sulfonamido group are preferred, because the aggregating property of dye and the fastness are enhanced. Other than these, the alkyl group may have a halogen atom or an ionic hydrophilic group.

The substituted or unsubstituted cycloalkyl group represented by $R_1$, $R_2$ and $R_3$ is preferably a cycloalkyl group having a carbon number of 5 to 12. The cycloalkyl group is more preferably a cycloalkyl group having an asymmetric carbon (use in the racemic form), because the solubility of dye and the stability of ink are enhanced.

Examples of the substituent are the same as those of the substituent described later when $R_1$, $R_2$, $R_3$, $Y_1$, $Y_2$, $Y_3$ and $Y_4$ each may further have a substituent. In particular, a hydroxyl group, an ether group, an ester group, a cyano group, an amido group and a sulfonamido group are preferred, because the aggregating property of dye and the fastness are enhanced. Other than these, the cycloalkyl group may have a halogen atom or an ionic hydrophilic group.

The substituted or unsubstituted alkenyl group represented by $R_1$, $R_2$ and $R_3$ is preferably an alkenyl group having a carbon number of 2 to 12. The alkenyl group is more preferably a branched alkenyl group, still more preferably an alkenyl group having an asymmetric carbon (use in the racemic form), because the solubility of dye and the stability of ink are enhanced.

Examples of the substituent are the same as those of the substituent described later when $R_1$, $R_2$, $R_3$, $Y_1$, $Y_2$, $Y_3$ and $Y_4$ each may further have a substituent. In particular, a hydroxyl group, an ether group, an ester group, a cyano group, an amido group and a sulfonamido group are preferred, because the aggregating property of dye and the fastness are enhanced. Other than these, the alkenyl group may have a halogen atom or an ionic hydrophilic group.

The substituted or unsubstituted aralkyl group represented by $R_1$, $R_2$ and $R_3$ is preferably an aralkyl group having a carbon number of 7 to 18. The aralkyl group is more preferably a branched aralkyl group, still more preferably an aralkyl group having an asymmetric carbon (use in the racemic form), because the solubility of dye and the stability of ink are enhanced.

Examples of the substituent are the same as those of the substituent described later when $R_1$, $R_2$, $R_3$, $Y_1$, $Y_2$, $Y_3$ and $Y_4$ each may further have a substituent. In particular, a hydroxyl group, an ether group, an ester group, a cyano group, an amido group and a sulfonamido group are preferred, because the aggregating property of dye and the fastness are enhanced. Other than these, the aralkyl group may have a halogen atom or an ionic hydrophilic group.

The substituted or unsubstituted aryl group represented by $R_1$, $R_2$ and $R_3$ is preferably an aryl group having a carbon number of 6 to 12.

Examples of the substituent are the same as those of the substituent described later when $R_1$, $R_2$, $R_3$, $Y_1$, $Y_2$, $Y_3$ and $Y_4$ each may further have a substituent. Among these, an electron-withdrawing group is preferred, because the oxidation potential of the dye becomes noble and the fastness is enhanced. In particular, a halogen atom, a hetero group, a cyano group, a carboxyl group, an acylamino group, a sulfonamido group, a sulfamoyl group, a carbamoyl group, a sulfonyl group, an amido group, an acyl group, a sulfo group and a quaternary ammonium group are preferred, and a cyano group, a carboxyl group, a sulfamoyl group, a carbamoyl group, a sulfonyl group, an imido group, an acyl group, a sulfo group and a quaternary ammonium group are more preferred.

The heterocyclic group represented by $R_1$, $R_2$ and $R_3$ preferably has a 5- or 6-membered ring, and such a ring may be further ring-condensed. Also, the heterocyclic group may be an aromatic heterocyclic group or a non-aromatic heterocyclic group.

Examples of the heterocyclic group represented by $R_1$, $R_2$ and $R_3$ are described below in the form of a hetero ring by omitting the substitution site, but the substitution site is not limited and, for example, pyridine can be substituted at the 2-position, 3-position or 4-position. However, substitution by a heteroatom of the heterocyclic group is not preferred. Examples of the heterocyclic group include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazoline and thiazoline.

Above all, the heterocyclic group is preferably an aromatic heterocyclic group. Preferred examples thereof include, as denoted in the same manner as above, pyridine, pyrazine, pyrimidine, pyridazine, triazine, pyrazole, imidazole, benzimidazole, triazole, thiazole, benzothiazole, isothiazole, benzisothiazole and thiadiazole.

These groups each may have a substituent, and examples of the substituent are the same as those of the substituent described later when $R_1$, $R_2$, $R_3$, $Y_1$, $Y_2$, $Y_3$ and $Y_4$ each may further have a substituent.

Preferred substituents are the same as preferred substituents of the aryl group above, and more preferred substituents are the same as more preferred substituents of the aryl group above.

In formula (I), $Y_1$, $Y_2$, $Y_3$ and $Y_4$ each independently represents a hydrogen atom or a monovalent substituent, and the monovalent substituent may further have a substituent.

Examples of the monovalent substituent represented by $Y_1$, $Y_2$, $Y_3$ and $Y_4$ include a halogen atom, an alkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group and an ionic hydrophilic group. These groups each may further have a substituent.

$Y_1$ to $Y_4$ each is preferably a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group or an ionic hydrophilic group, more preferably a hydrogen atom, a halogen atom, substituted or unsubstituted sulfamoyl group or an ionic hydrophilic group, still more preferably a hydrogen atom, a substituted or unsubstituted sulfamoyl group or an ionic hydrophilic group, and most preferably a hydrogen atom. The number of carbon atoms in the monovalent substituent is preferably less than 8.

Incidentally, when $R_1$, $R_2$, $R_3$, $Y_1$, $Y_2$, $Y_3$ and $Y_4$ each is a group which may further have a substituent, the group may further have a substituent described below.

The substituent includes a linear or branched alkyl group having a carbon number of 1 to 12, a linear or branched aralkyl group having a carbon number of 7 to 18, a linear or branched alkenyl group having a carbon number of 2 to 12, a linear or branched alkynyl group having a carbon number of 2 to 12, a linear or branched cycloalkyl group having a carbon number of 3 to 12, a linear or branched cycloalkenyl group having a carbon number of 3 to 12 (these groups each is preferably a group having a branched chain, more preferably a group having an asymmetric carbon, because the solubility of dye and the stability of ink are enhanced; e.g., methyl, ethyl, propyl, isopropyl, sec-butyl, tert-butyl, 2-ethylhexyl, 2-methylsulfonylethyl, 3-phenoxypropyl, trifluoromethyl, cyclopentyl), a halogen atom (e.g., chlorine, bromine), an aryl group (e.g., phenyl, 4-tert-butylphenyl, 2,4-di-tert-amylphenyl), a heterocyclic group (e.g., imidazolyl, pyrazolyl, triazolyl, 2-furyl, 2-thienyl, 2-pyrimidinyl, 2-benzothiazolyl), a cyano group, a hydroxyl group, a nitro group, a carboxy group, an amino group, an alkyloxy group (e.g., methoxy, ethoxy, 2-methoxyethoxy, 2-methanesulfonylethoxy), an aryloxy group (e.g., phenoxy, 2-methylphenoxy, 4-tert-butylphenoxy, 3-nitrophenoxy, 3-tert-butyloxycarbamoylphenoxy, 3-methoxycarbamoyl), an acylamino group (e.g., acetamido, benzamido, 4-(3-tert-butyl-4-hydroxyphenoxy)butanamido), an alkylamino group (e.g., methylamino, butylamino, diethylamino, methylbutylamino), an arylamino group (e.g., phenylamino, 2-chloroanilino), a ureido group (e.g., phenylureido, methylureido, N,N-dibutylureido), a sulfamoylamino group (e.g., N,N-dipropylsulfamoylamino), an alkylthio group (e.g., methylthio, octylthio, 2-phenoxyethylthio), an arylthio group (e.g., phenylthio, 2-butoxy-5-tert-octylphenylthio, 2-carboxyphenylthio), an alkyloxycarbonylamino group (e.g., methoxycarbonylamino), a sulfonamido group (e.g., methanesulfonamido, benzenesulfonamido, p-toluenesulfonamido), a carbamoyl group (e.g., N-ethylcarbamoyl, N,N-dibutylcarbamoyl), a sulfamoyl group (e.g., N-ethylsulfamoyl, N,N-dipropylsulfamoyl, N-phenylsulfamoyl), a sulfonyl group (e.g., methanesulfonyl, octanesulfonyl, benzenesulfonyl, toluenesulfonyl), an alkyloxycarbonyl group (e.g., methoxycarbonyl, butyloxycarbonyl), a heterocyclic oxy group (e.g., 1-phenyltetrazol-5-oxy, 2-tatrahydropyranyloxy), an azo group (e.g., phenylazo, 4-methoxyphenylazo, 4-pivaloylaminophenylazo, 2-hydroxy-4-propanoylphenylazo), an acyloxy group (e.g., acetoxy), a carbamoyloxy group (e.g., N-methylcarbamoyloxy, N-phenylcarbamoyloxy), a silyloxy group (e.g., trimethylsilyloxy, dibutylmethylsilyloxy), an aryloxycarbonylamino group (e.g., phenoxycarbonylamino), an imido group (e.g., N-succinimido, N-phthalimido), a heterocyclic thio group (e.g., 2-benzothiazolylthio, 2,4-di-phenoxy-1,3,5-triazole-6-thio, 2-pyridylthio), a sulfinyl group (e.g., 3-phenoxypropylsulfinyl), a phosphonyl group (e.g., phenoxyphosphonyl, octyloxyphosphonyl, phenylphosphonyl), an aryloxycarbonyl group (e.g., phenoxycarbonyl), an acyl group (e.g., acetyl, 3-phenylpropanoyl, benzoyl), and an ionic hydrophilic group (e.g., carboxyl, sulfo, phosphono, quaternary ammonium).

$a_1$ to $a_4$ and $b_1$ to $b_4$ represent the number of substituents $X_1$ to $X_4$ and $Y_1$ to $Y_4$, respectively, and $a_1$ to $a_4$ and $b_1$ to $b_4$ each independently represents an integer of 0 to 4, provided that $a_1$ to $a_4$ all are not 0 at the same time.

$a_1$ and $b_1$ each independently represents preferably an integer of 0 to 4 satisfying the relationship of $a_1+b_1=4$. In particular, a combination where $a_1$ is 1 or 2 and $b_1$ is 3 or 2 is more preferred, and a combination where $a_1$ is 1 and $b_1$ is 3 is most preferred.

$a_2$ and $b_2$ each independently represents preferably an integer of 0 to 4 satisfying the relationship of $a_2+b_2=4$. In particular, a combination where $a_2$ is 1 or 2 and $b_2$ is 3 or 2 is more preferred, and a combination where $a_2$ is 1 and $b_2$ is 3 is most preferred.

$a_3$ and $b_3$ each independently represents preferably an integer of 0 to 4 satisfying the relationship of $a_3+b_3=4$. In particular, a combination where $a_3$ is 1 or 2 and $b_3$ is 3 or 2 is more preferred, and a combination where $a_3$ is 1 and $b_3$ is 3 is most preferred.

$a_4$ and $b_4$ each independently represents preferably an integer of 0 to 4 satisfying the relationship of $a_4+b_4=4$. In particular, a combination where $a_4$ is 1 or 2 and $b_4$ is 3 or 2 is more preferred, and a combination where $a_4$ is 1 and $b_4$ is 3 is most preferred.

Preferred combinations as the colorant represented by formula (I) are summarized as follows.

(a) $X_1$, $X_2$, $X_3$ and $X_4$ each is independently preferably a substituent selected from —SO—$R_1$, —SO$_2$—$R_1$, —SO$_2$NR$_2$R$_3$, —CONR$_2$R$_3$, —CO$_2$—$R_1$ or —CO—$R_1$, a sulfo group and a salt thereof, a carboxyl group and a salt thereof, and a phosphono group and a salt thereof, more preferably a substituent selected from —SO$_2$—$R_1$, —SO$_2$NR$_2$R$_3$, —CONR$_2$R$_3$, —CO$_2$—$R_1$, —CO—$R_1$, a sulfo group and a salt thereof, a carboxyl group and a salt thereof, and a phosphono group and a salt thereof, still more preferably a substituent selected from —SO$_2$—$R_1$, —SO$_2$NR$_2$R$_3$, a sulfo group and a salt thereof, and most preferably a substituent selected from —SO$_2$NR$_2$R$_3$, a sulfo group and a salt thereof.

(b) $R_1$ is preferably a substituted or unsubstituted alkyl group, a substituted or unsubstituted aryl group or a substituted or unsubstituted heterocyclic group, more preferably a substituted alkyl group, a substituted aryl group or a substituted heterocyclic group, and most preferably a substituted alkyl group having an ionic hydrophilic group and/or a hydroxyl group as a substituent.

(c) $R_2$ is preferably a hydrogen atom, a substituted or unsubstituted alkyl group, a substituted or unsubstituted aryl group or a substituted or unsubstituted heterocyclic group, more preferably a hydrogen atom, a substituted alkyl group, a substituted aryl group or a substituted heterocyclic group, and most preferably a hydrogen atom.

(d) $R_3$ is preferably a hydrogen atom, a substituted or unsubstituted alkyl group, a substituted or unsubstituted aryl group or a substituted or unsubstituted heterocyclic group, more preferably a substituted alkyl group, a substituted aryl group or a substituted heterocyclic group, and most preferably a substituted alkyl group having an ionic hydrophilic group and/or a hydroxyl group as a substituent.

(e) M is preferably Cu, Ni, Zn, Al or the like, and most preferably Cu.

(f) $Y_1$, $Y_2$, $Y_3$ and $Y_4$ each is independently preferably a hydrogen atom, a halogen atom, substituted or unsubstituted sulfamoyl group or an ionic hydrophilic group, more preferably a hydrogen atom, a substituted or unsubstituted sulfamoyl group or an ionic hydrophilic group, and most preferably a hydrogen atom.

(g) $a_1$ to $a_4$ each is independently preferably an integer of 1 or 2, more preferably 1, and $b_1$ to $b_4$ each is independently preferably an integer of 3 or 2, more preferably 3.

(h) The average molecular weight of the phthalocyanine derivative as the colorant for use in the present invention is preferably from 750 to 2,500, more preferably from 995 to 2,500, still more preferably from 995 to 2,000, and most preferably from 995 to 1,800.

(i) Among the colorants represented by formula (I), a colorant having at least one ionic hydrophilic group per one unit of the phthalocyanine nucleus is preferred, a colorant where the ionic hydrophilic group is a sulfo group is more preferred, a colorant having a lithium salt of sulfo group is still more preferred, and a colorant having two or more lithium salts, of sulfo groups is most preferred. The amount of the lithium ion is 50% or more, preferably 60% or more, more preferably 80% or more, still more preferably 90% or more, with a preferred upper limit of 100%, based on the entire counter ion of the ionic hydrophilic group.

(j) As for the number of ionic hydrophilic groups contained in the phthalocyanine derivative as the colorant represented by formula (I) of the present invention, those having at least one ionic hydrophilic group within one molecule of the phthalocyanine derivative are preferred, those having two or more ionic hydrophilic groups are more preferred, and those having at least two or more sulfo groups and/or carboxyl groups are most preferred because of their good solubility or dispersibility in an aqueous medium.

As for the preferred combination of substituents in the colorant represented by formula (I) of the present invention, a compound where at least one of various substituents is the preferred group is preferred, a compound where a larger number of various substituents are the preferred groups is more preferred, and a compound where all substituents are the preferred groups is most preferred.

Among the colorants represented by formula (I) for use in the present invention, a phthalocyanine derivative having a structure represented by the following formula (II) is more preferred.

The colorant represented by formula (II) for use in the present invention includes a sole phthalocyanine derivative (dye) represented by formula (II), a salt or hydrate thereof, and a dye mixture or a salt or hydrate thereof. The salts or hydrates may be used individually or as a mixture in the colorant.

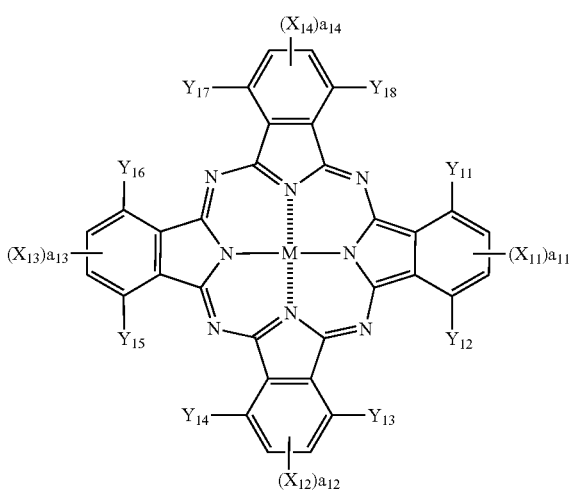

Formula (II)

In formula (II), M has the same meaning as M in formula (I), and preferred examples are also the same.

In formula (II), $X_{11}$, $X_{12}$, $X_{13}$ and $X_{14}$ each independently represents a substituent selected from —$SO_2NR_2R_3$, —$CONR_2R_3$, —$CO_2$—$R_1$, —CO—$R_1$, a sulfo group and a salt thereof, a carboxyl group and a salt thereof, and a phosphono group and a salt thereof.

$X_{11}$, $X_{12}$, $X_{13}$ and $X_{14}$ each is independently preferably —$SO_2NR_2R_3$, —$CONR_2R_3$, —$CO_2$—$R_1$, —CO—$R_1$, a sulfo group or a salt thereof, more preferably —$SO_2NR_2R_3$, a sulfo group or a salt thereof, and most preferably —$SO_2NHR_3$, a sulfo group or a salt thereof.

In formula (II), $R_1$, $R_2$ and $R_3$ each independently has the same meaning as $R_1$, $R_2$ or $R_3$ in formula (I).

In formula (II), $Y_{11}$, $Y_{12}$, $Y_{13}$, $Y_{14}$, $Y_{15}$, $Y_{16}$, $Y_{17}$ and $Y_{18}$ each independently represents a hydrogen atom or a monovalent substituent, and the monovalent substituent may further have a substituent.

In formula (II), $Y_{11}$, $Y_{12}$, $Y_{13}$, $Y_{14}$, $Y_{15}$, $Y_{16}$, $Y_{17}$ and $Y_{18}$ have the same meanings as $Y_1$, $Y_2$, $Y_3$ and $Y_4$ in formula (I), and preferred examples are also the same.

Here, at least one of $X_{11}$, $X_{12}$, $X_{13}$, $X_{14}$, $Y_{11}$, $Y_{12}$, $Y_{13}$, $Y_{14}$, $Y_{15}$, $Y_{16}$, $Y_{17}$ and $Y_{18}$ is itself an ionic hydrophilic group or has an ionic hydrophilic group as a substituent.

In formula (II), $a_{11}$, $a_{12}$, $a_{13}$ and $a_{14}$ represent the number of substituents $X_{11}$, $X_{12}$, $X_{13}$ and $X_{14}$, respectively, and each represents an integer of 0 to 2.

$a_{11}$ to $a_{14}$ each is independently an integer of 0 to 2, but $a_{11}$ to $a_{14}$ all are not 0 at the same time. $a_{11}$ to $a_{14}$ each is independently preferably an integer of 1 or 2, and $a_{11}=a_{12}=a_{13}=a_{14}=1$ is most preferred.

Also, in the phthalocyanine compound represented by formula (II), Pc (phthalocyanine ring) may form a dimer (for example, Pc-M-L-M-Pc) or a trimer through L (divalent linking group), where the plurality of M's may be the same or different.

The divalent linking group represented by L is preferably an oxy group (—O—), a thio group (—S—), a carbonyl group (—CO—), a sulfonyl group (—$SO_2$—), an imino group (—NH—), a methylene group (—$CH_2$—) or a group formed by a combination thereof.

Preferred combinations as the colorant represented by formula (II) are summarized as follows.

(a) $X_{11}$, $X_{12}$, $X_{13}$ and $X_{14}$ each is independently preferably —$SO_2NR_2R_3$, —$CONR_2R_3$, —$CO_2$—$R_1$, —CO—$R_1$, a sulfo group or a salt thereof, more preferably —$SO_2NR_2R_3$, a sulfo group or a salt thereof, and most preferably —$SO_2NHR_3$, a sulfo group or a salt thereof.

(b) $R_1$ is preferably a substituted or unsubstituted alkyl group, a substituted or unsubstituted aryl group or a substituted or unsubstituted heterocyclic group, more preferably a substituted alkyl group, a substituted aryl group or a substituted heterocyclic group, and most preferably a substituted alkyl group having an ionic hydrophilic group and/or a hydroxyl group as a substituent.

(c) $R_2$ is preferably a hydrogen atom, a substituted or unsubstituted alkyl group, a substituted or unsubstituted aryl group or a substituted or unsubstituted heterocyclic group, more preferably a hydrogen atom, a substituted alkyl group, a substituted aryl group or a substituted heterocyclic group, and most preferably a hydrogen atom.

(d) $R_3$ is preferably a hydrogen atom, a substituted or unsubstituted alkyl group, a substituted or unsubstituted aryl group or a substituted or unsubstituted heterocyclic group, more preferably a substituted alkyl group, a substituted aryl group or a substituted heterocyclic group, and most preferably a substituted alkyl group having an ionic hydrophilic group and/or a hydroxyl group as a substituent.

(e) M is preferably Cu, Ni, Zn, Al or the like, and most preferably Cu.

(f) $a_{11}$ to $a_{14}$ each is independently preferably an integer of 1 or 2, more preferably 1, and $a_{11}=a_{12}=a_{13}=a_{14}=1$ is most preferred.

(g) The average molecular weight of the phthalocyanine derivative as the colorant for use in the present invention is preferably from 750 to 2,500, more preferably from 995 to 2,500, still more preferably from 995 to 2,000, and most preferably from 995 to 1,800.

(h) Among the colorants represented by formula (II), a colorant having at least one ionic hydrophilic group per one unit of the phthalocyanine nucleus is preferred, a colorant where the ionic hydrophilic group is a sulfo group is more preferred, a colorant having a lithium salt of sulfo group is still more preferred, and a colorant having two or more lithium salts of sulfo group is most preferred. The amount of the lithium ion is 50% or more, preferably 60% or more, more preferably 80% or more, still more preferably 90% or more, with a preferred upper limit of 100%, based on the entire counter ion of the ionic hydrophilic group.

(i) As for the number of ionic hydrophilic groups contained in the phthalocyanine derivative as the colorant represented by formula (II) of the present invention, those having at least one ionic hydrophilic group within one molecule of the phthalocyanine derivative are preferred, those having two or more ionic hydrophilic groups are more preferred, and those having at least two or more sulfo groups and/or carboxyl groups are most preferred because of their good solubility or dispersibility in an aqueous medium.

As for the preferred combination of substituents in the colorant represented by formula (II) of the present invention, a compound where at least one of various substituents is the preferred group is preferred, a compound where a larger number of various substituents are the preferred groups is more preferred, and a compound where all substituents are the preferred groups is most preferred.

Among the colorants represented by formula (II) for use in the present invention, a phthalocyanine derivative having a structure represented by the following formula (III) is more preferred.

The colorant represented by formula (III) for use in the present invention includes a sole phthalocyanine derivative (dye) represented by formula (III), a salt or hydrate thereof and a dye mixture or a salt or hydrate thereof. The salts or hydrates may be used individually or as a mixture in the colorant.

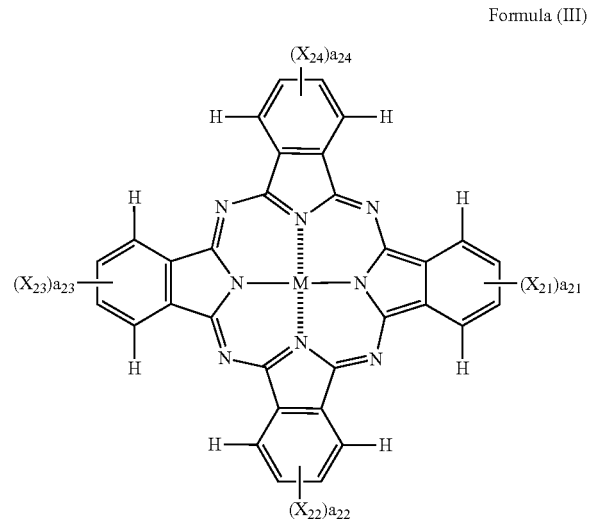

Formula (III)

In formula (III), M has the same meaning as M in formula (II), and preferred examples are also the same.

In formula (III), $X_{21}$, $X_{22}$, $X_{23}$ and $X_{24}$ each independently represents a substituent selected from —$SO_2NR_2R_3$, —$CONR_2R_3$, —$CO_2$—$R_1$, —CO—$R_1$, a sulfo group and a salt thereof, a carboxyl group and a salt thereof, and a phosphono group and a salt thereof.

Here, at least one of $X_{21}$, $X_{22}$, $X_{23}$ and $X_{24}$ is itself an ionic hydrophilic group or has an ionic hydrophilic group as a substituent.

$X_{21}$, $X_{22}$, $X_{23}$ and $X_{24}$ each is independently preferably —$SO_2NR_2R_3$, —$CONR_2R_3$, —$CO_2$—$R_1$, —CO—$R_1$, a sulfo group or a salt thereof, more preferably —$SO_2NR_2R_3$, a sulfa group or a salt thereof, and most preferably —$SO_2NHR_3$, a sulfo group or a salt thereof.

In formula (III), $R_1$, $R_2$ and $R_3$ each independently has the same meaning as $R_1$, $R_2$ or $R_3$ in formula (II), and preferred examples are also the same.

In formula (III), $a_{21}$, $a_{22}$, $a_{23}$ and $a_{24}$ represent the number of substituents $X_{21}$, $X_{22}$, $X_{23}$ and $X_{24}$, respectively, and each represents an integer of 0 to 2, provided that $a_{21}$ to $a_{24}$ all are not 0 at the same time.

Also, in the phthalocyanine compound represented by formula (III), Pc (phthalocyanine ring) may form a dimer (for example, Pc-M-L-M-Pc) or a trimer through L (divalent linking group), where the plurality of M's may be the same or different.

The divalent linking group represented by L is preferably an oxy group —O—, a thio group —S—, a carbonyl group —CO—, a sulfonyl group —$SO_2$—, an imino group (—NH—), a methylene group (—$CH_2$—) or a group formed by a combination thereof.

Preferred combinations as the colorant represented by formula (III) are summarized as follows.

(a) $X_{21}$, $X_{22}$, $X_{23}$ and $X_{24}$ each is independently preferably —$SO_2NR_2R_3$, —$CONR_2R_3$, —$CO_2$—$R_1$, —CO—$R_1$, a sulfo group or a salt thereof, more preferably —$SO_2NR_2R_3$, a sulfo group or a salt thereof, and most preferably —$SO_2NHR_3$, a sulfo group or a salt thereof.

(b) $R_1$ is preferably a substituted or unsubstituted alkyl group, a substituted or unsubstituted aryl group or a substituted or unsubstituted heterocyclic group, more preferably a substituted alkyl group, a substituted aryl group or a substituted heterocyclic group, and most preferably a substituted alkyl group having an ionic hydrophilic group and/or a hydroxyl group as a substituent.

(c) $R_2$ is preferably a hydrogen atom, a substituted or unsubstituted alkyl group, a substituted or unsubstituted aryl group or a substituted or unsubstituted heterocyclic group, more preferably a hydrogen atom, a substituted alkyl group, a substituted aryl group or a substituted heterocyclic group, and most preferably a hydrogen atom.

(d) $R_3$ is preferably a hydrogen atom, a substituted or unsubstituted alkyl group, a substituted or unsubstituted aryl group or a substituted or unsubstituted heterocyclic group, more preferably a substituted alkyl group, a substituted aryl group or a substituted heterocyclic group, and most preferably a substituted alkyl group having an ionic hydrophilic group and/or a hydroxyl group as a substituent.

(e) M is preferably Cu, Ni, Zn, Al or the like, and most preferably Cu.

(f) $a_{21}$ to $a_{24}$ each is independently preferably an integer of 1 or 2, more preferably 1, and $a_{21}=a_{22}=a_{23}=a_{24}=1$ is most preferred.

(g) The average molecular weight of the phthalocyanine derivative as the colorant for use in the present invention is preferably from 750 to 2,500, more preferably from 995 to 2,500, still more preferably from 995 to 2,000, and most preferably from 995 to 1,800.

(h) Among the colorants represented by formula (III), a colorant having at least one ionic hydrophilic group per one unit of the phthalocyanine nucleus is preferred, a colorant where the ionic hydrophilic group is a sulfo group is more preferred, a colorant having a lithium salt of sulfo group is still more preferred, and a colorant having two or more lithium salts of sulfo group is most preferred. The amount of the lithium ion is 50% or more, preferably 60% or more, more preferably 80% or more, still more preferably 90% or more, with a preferred upper limit of 100%, based on the entire counter ion of the ionic hydrophilic group.

(i) As for the number of ionic hydrophilic groups contained in the phthalocyanine derivative as the colorant represented by formula (III) of the present invention, those having at least one or more ionic hydrophilic group within one molecule of the phthalocyanine derivative are preferred, those having two or more ionic hydrophilic groups are more preferred, and those having at least two or more sulfa groups and/or carboxyl groups are most preferred because of their good solubility or dispersibility in an aqueous medium.

As for the preferred combination of substituents in the colorant represented by formula (III) of the present invention, a compound where at least one of various substituents is the preferred group is preferred, a compound where a larger number of various substituents are the preferred groups is more preferred, and a compound where all substituents are the preferred groups is most preferred.

Among the colorants represented by formula (III) for use in the present invention, a phthalocyanine derivative having a structure represented by the following formula (IV) is more preferred.

The colorant represented by formula (IV) for use in the present invention includes a sole phthalocyanine derivative (dye) represented by formula (IV), a salt or hydrate thereof, and a dye mixture or a salt or hydrate thereof. The salts or hydrates may be used individually or as a mixture in the colorant.

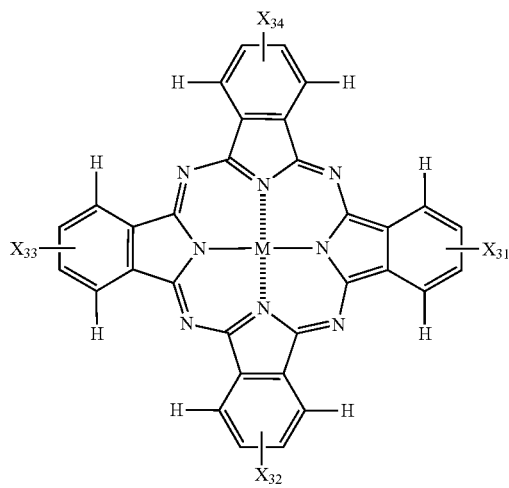

Formula (IV)

In formula (IV), M has the same meaning as M in formula (III), and preferred examples are also the same.

In formula (IV), $X_{31}$, $X_{32}$, $X_{33}$ and $X_{34}$ each independently represents a substituent selected from —SO$_2$NR$_2$R$_3$, —CONR$_2$R$_3$, —CO$_2$—R$_1$, —CO—R$_1$, a sulfo group and a salt thereof, a carboxyl group and a salt thereof, and a phosphono group and a salt thereof.

Here, at least one of $X_{31}$, $X_{32}$, $X_{33}$ and $X_{34}$ is itself an ionic hydrophilic group or has an ionic hydrophilic group as a substituent.

$X_{31}$, $X_{32}$, $X_{33}$ and $X_{34}$ each is independently preferably —SO$_2$NR$_2$R$_3$, —CONR$_2$R$_3$, —CO$_2$—R$_1$, —CO—R$_1$, a sulfo group or a salt thereof, more preferably —SO$_2$NR$_2$R$_3$, a sulfo group or a salt thereof, and most preferably —SO$_2$NHR$_3$, a sulfo group or a salt thereof.

In formula (IV), R$_1$, R$_2$ and R$_3$ each independently has the same meaning as R$_1$, R$_2$ or R$_3$ in formula (III), and preferred examples are also the same.

Also, in the phthalocyanine compound represented by formula (IV), Pc (phthalocyanine ring) may form a dimer (for example, Pc-M-L-M-Pc) or a trimer through L (divalent linking group), where the plurality of M's may be the same or different.

The divalent linking group represented by L is preferably an oxy group —O—, a thio group —S—, a carbonyl group —CO—, a sulfonyl group —SO$_2$—, an imino group (—NH—), a methylene group (—CH$_2$—) or a group formed by a combination thereof.

Preferred combinations as the colorant represented by formula (IV) are summarized as follows.

(a) $X_{31}$, $X_{32}$, $X_{33}$ and $X_{34}$ each is independently preferably —SO$_2$NR$_2$R$_3$, —CONR$_2$R$_3$, —CO$_2$—R$_1$, —CO—R$_1$, a sulfo group or a salt thereof, more preferably —SO$_2$NR$_2$R$_3$, a sulfo group or a salt thereof, and most preferably —SO$_2$NHR$_3$, a sulfo group or a salt thereof.

(b) R$_1$ is preferably a substituted or unsubstituted alkyl group, a substituted or unsubstituted aryl group or a substituted or unsubstituted heterocyclic group, more preferably a substituted alkyl group, a substituted aryl group or a substituted heterocyclic group, and most preferably a substituted alkyl group having an ionic hydrophilic group and/or a hydroxyl group as a substituent.

(c) R$_2$ is preferably a hydrogen atom, a substituted or unsubstituted alkyl group, a substituted or unsubstituted aryl group or a substituted or unsubstituted heterocyclic group, more preferably a hydrogen atom, a substituted alkyl group, a substituted aryl group or a substituted heterocyclic group, and most preferably a hydrogen atom.

(d) R$_3$ is preferably a hydrogen atom, a substituted or unsubstituted alkyl group, a substituted or unsubstituted aryl group or a substituted or unsubstituted heterocyclic group, more preferably a substituted alkyl group, a substituted aryl group or a substituted heterocyclic group, and most preferably a substituted alkyl group having an ionic hydrophilic group and/or a hydroxyl group as a substituent.

(e) M is preferably Cu, Ni, Zn, Al or the like, and most preferably Cu.

(f) The average molecular weight of the phthalocyanine derivative as the colorant for use in the present invention is preferably from 750 to 2,500, more preferably from 995 to 2,500, still more preferably from 995 to 2,000, and most preferably from 995 to 1,800.

(g) Among the colorants represented by formula (IV), a colorant having at least one ionic hydrophilic group per one unit of the phthalocyanine nucleus is preferred, a colorant where the ionic hydrophilic group is a sulfo group is more preferred, a colorant having a lithium salt of sulfo group is still more preferred, and a colorant having two or more lithium salts of sulfo group is most preferred. The amount of the lithium ion is 50% or more, preferably 60% or more, more preferably 80% or more, still more preferably 90% or more, with a preferred upper limit of 100%, based on the entire counter ion of the ionic hydrophilic group.

(h) As for the number of ionic hydrophilic groups contained in the phthalocyanine derivative as the colorant represented by formula (IV) of the present invention, those having at least one ionic hydrophilic group within one molecule of the phthalocyanine derivative are preferred, those having two or more ionic hydrophilic groups are more preferred, and those having at least two or more sulfo groups and/or carboxyl groups are most preferred because of their good solubility or dispersibility in an aqueous medium.

As for the preferred combination of substituents in the colorant represented by formula (IV) of the present invention, a compound where at least one of various substituents is the preferred group is preferred, a compound where a larger number of various substituents are the preferred groups is more preferred, and a compound where all substituents are the preferred groups is most preferred.

In general, the ink composition for inkjet recording is known to use various phthalocyanine compounds. The phthalocyanine compound represented by the following formula (X) sometimes contains an isomer with respect to the substitution site of the substituent $R''$ (n=1 to 16) (here, $R^1$ to $R^{16}$ are defined as substituents at 1-position to 16-position, respectively), which inevitably occurs at the time of synthesis, but these substitution site isomers are not distinguished from each other but regarded as the same derivative in many cases. Also, in the case where the substituent R contains an isomer, these are not distinguished but regarded as the same phthalocyanine compound in many cases.

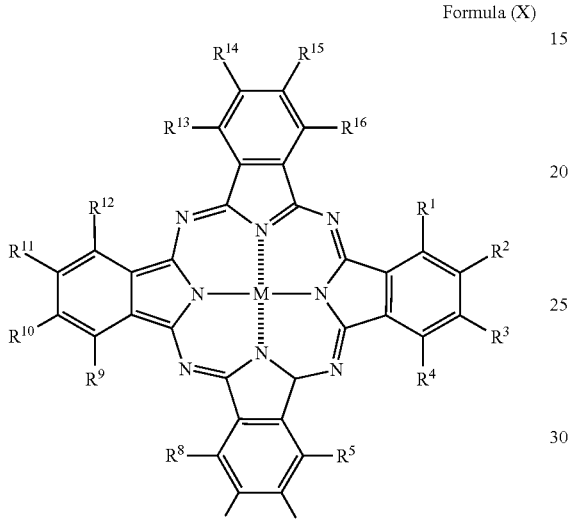

Formula (X)

To describe the definition in the present invention by referring to formula (X), the case where the structure of the phthalocyanine compound is different indicates a case where the constituent atom species of the substituent $R''$ (n=1 to 16) is different, a case where the number of substituents $R''$ is different, or a case where the positions of the substituents $R''$ are different.

In the present invention, the derivatives differing in the structure of the phthalocyanine compound represented by formula (X) (particularly, the substitution site) are defined by classifying these into the following three groups.

(1) β-Position substitution type: (a phthalocyanine compound having specific substituents at the 2- and/or 3-position, the 6- and/or 7-position, the 10- and/or 11-position, and the 14- and/or 15-position)

(2) α-Position substitution type: (a phthalocyanine compound having specific substituents at the 1- and/or 4-position, the 5- and/or 8-position, the 9- and/or 12-position, and the 13- and/or 16-position)

(3) α,β-Position mixed substitution type: (a phthalocyanine compound having specific substitutions at the 1- to 16-positions without any regularity)

In the present invention, phthalocyanine derivatives differing in the structure (particularly, the substitution site) are described by using these (1) β-position substitution type, (2) α-position substitution type and (3) α,β-position mixed substitution type.

The obtained phthalocyanine derivative (for example, when k=l=m=n=1) is usually a mixture of compounds represented by the following formulae (a)-1 to (a)-4 which are isomers with respect to the introduction site of each of the substituents $G_1$, $G_2$, $G_3$ and $G_4$ (common in that the introduction site is the β-position).

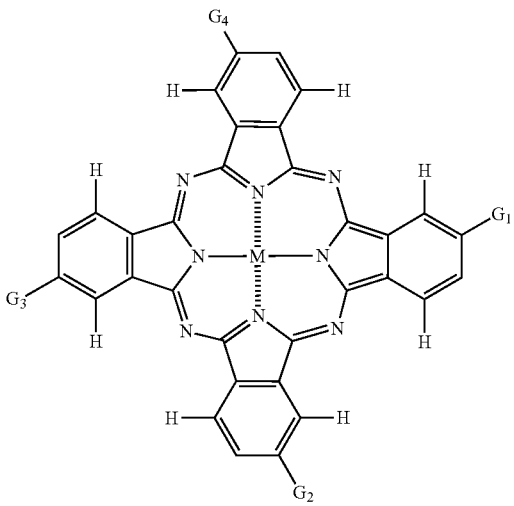

Formula (a)-1

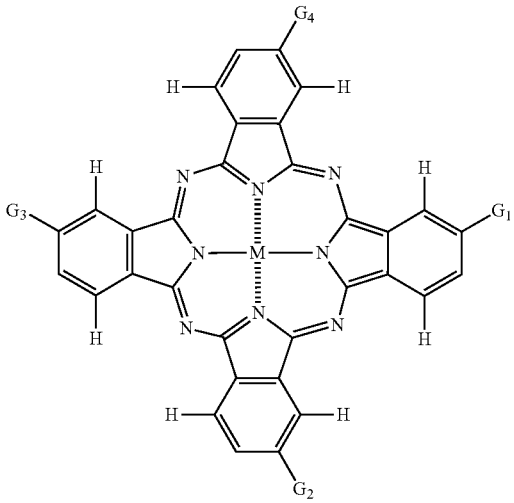

Formula (a)-2

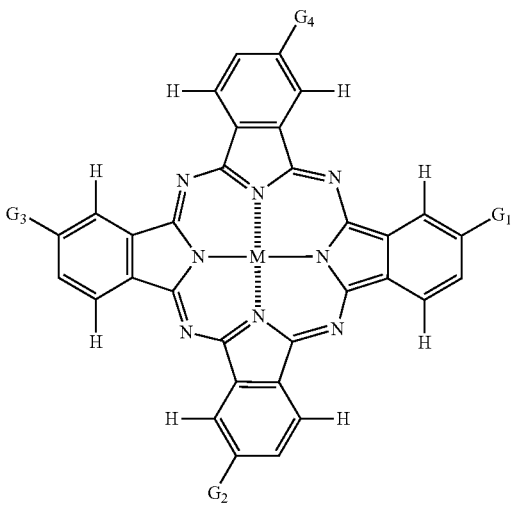

Formula (a)-3

Formula (a)-4

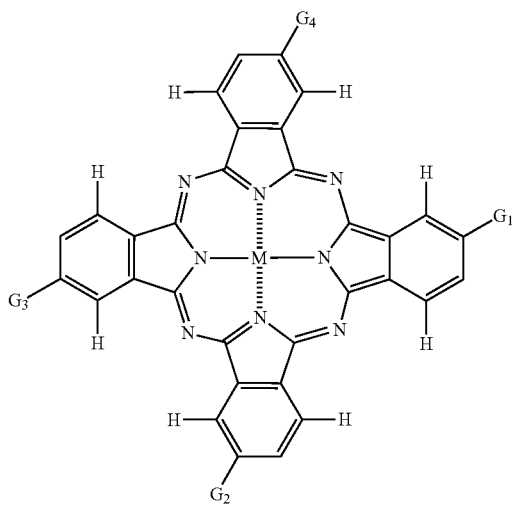

That is, the compounds represented by formulae (a)-1 to (a)-4 are the β-position substitution type (a phthalocyanine compound having specific substituents at the 2- and/or 3-position, the 6- and/or 7-position, the 10- and/or 11-position, and the 14- and/or 15-position) and are compounds utterly differing in the structure (different in the introduction site of specific substituents) from the α-position substitution type (a phthalocyanine compound having specific substituents at the 1- and/or 4-position, the 5- and/or 8-position, the 9- and/or 12-position, and the 13- and/or 16-position) and the α,β-position mixed substitution type (a phthalocyanine compound having specific substitutions at the 1- to 16-positions without any regularity). This is a structural feature very important as means for achieving the objects of the present invention.

The detailed reasons why the problems to be solved by the present invention have been overcome are not known, but a derivative where a soluble group is introduced only into the β-position tends to be by far excellent in the color hue, light fastness, ozone gas resistance and the like as compared with other derivatives.

More specifically, the phthalocyanine compound for use in the present invention having [1] a good spectral absorption property (aggregation of the phthalocyanine compound is accelerated by virtue of introduction of a specific soluble group into the β-position), [2] high image fastness (by virtue of high oxidation potential and acceleration of strong aggregation, for example, color fading by an oxidation reaction between the phthalocyanine compound and the ozone gas as an electrophilic reagent is suppressed), [3] high solubility in the ink composition, and [4] an ability of giving an ink solution with good aging stability, is considered to be achieved by introducing a specific number of specific soluble groups into specific positions (β-position), that is, enabling to form a firm aggregate of a completely β-position substitution-type phthalocyanine compound having high oxidation potential and at the same time, selectively introduce only an objective number of specific soluble groups.

Specific examples (Dyes 101 to 120) of the colorant for use in the present invention are set forth below, but the present invention is limited to these specific examples, In Table 1 below, formula (XX-1) represents a (k)-valent phthalocyanine nucleus (the introduction site of the substituent R is the β-position substitution type defined in the present invention), t represents a number of 1 or 2, and k represents a number satisfying $4 \leq k \leq 8$.

Formula (XX-1)

$M\text{-Pc-}(R)_k =$ 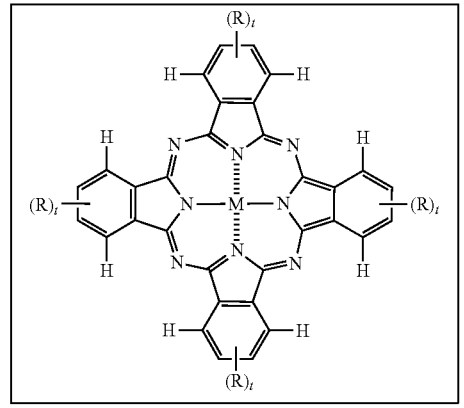

TABLE 1

| | | $M\text{-Pc-}(R)_k$ | |
|---|---|---|---|
| Compound No. | M | $R_1$ | k |
| 101 | Cu | $-SO_2NH-(CH_2)_2-SO_3Li$ | 4 |
| 102 | Cu | $-SO_2NH-(CH_2)_3-SO_3Li$ | 4 |
| 103 | Cu | $-SO_2NH-(CH_2)_2-CO_2Na$ | 4 |
| 104 | Cu | $-SO_2NH-(CH_2)_2-SO_2NHCH_2\overset{\overset{\displaystyle OH}{\mid}}{C}HCH_2SO_3Li$ | 4 |
| 105 | Cu | $-SO_2NH-(CH_2)_2-SO_2NHCH_2\overset{\overset{\displaystyle OH}{\mid}}{C}HCH_2CO_2Na$ | 4 |

In the Table, introduction sites of respective substituents of (R) are in an irregular order within the β-position substitution type [showing isomers represented by formulae (a)-1 to (a)-4].

The value of k is the total number of substituents R in the phthalocyanine mother nucleus.

In Table 2 below, formula (XX-2) represents a (k+l)-valent phthalocyanine nucleus (the introduction site of the substituent R is the β-position substitution type defined in the present invention), R represents $R_1$ and/or $R_2$, t represents a number of t=1 or 2, k represents a number of 0<k<8, and l represents a number of 0<l<8, provided that k and l each represents a number satisfying 4≦k+l≦8.

In Table 3 below, formula (XX-3) represents a (k+l+m)-valent phthalocyanine nucleus (the introduction site of the substituent R is the β-position substitution type defined in the present invention), R represents $R_1$ and/or $R_2$ and/or $R_3$, t represents a number of t=1 or 2, k represents a number of 0<k<8, l represents a number of 0<l<8, and m represents a number of 0<m<8, provided that k, l and m each represents a number satisfying 4≦k+l+m≦8.

Formula (XX-2)

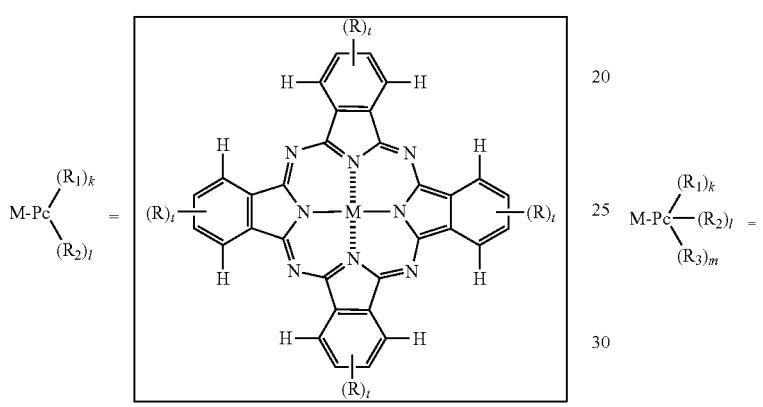

Formula (XX-3)

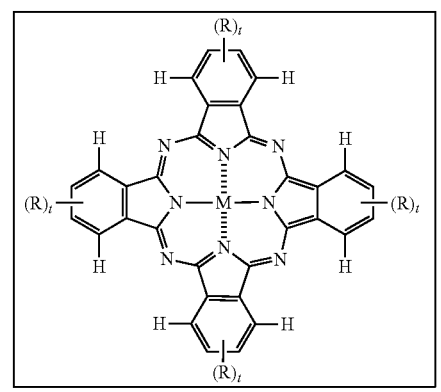

TABLE 2

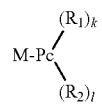

| Compound No. | M | $R_1$ | k | $R_2$ | l |
|---|---|---|---|---|---|
| 106 | Cu | —SO$_2$NH—(CH$_2$)$_2$—SO$_3$Li | 3 | —SO$_2$NH—(CH$_2$)$_2$—SO$_2$NH—C$_2$H$_4$OC$_2$H$_4$OH | 1 |
| 107 | Cu | —SO$_2$NH—(CH$_2$)$_2$—SO$_3$Li | 2 | —SO$_2$NH—(CH$_2$)$_2$—SO$_2$NH—CH$_2$CH(OH)CH$_3$ | 2 |
| 108 | Cu | —SO$_2$NH$_2$ | 2 | —SO$_2$NH—(CH$_2$)$_2$—SO$_2$NHCH$_2$CH(OH)CH$_2$SO$_3$Li | 2 |
| 109 | Cu | —SO$_2$NH$_2$ | 2 | —SO$_2$NH—(CH$_2$)$_2$—SO$_3$Li | 2 |
| 110 | Ni | —SO$_2$NH—(CH$_2$)$_2$—SO$_3$Li | 2 | —SO$_2$NH—(CH$_2$)$_2$—SO$_2$NH—CH$_2$CH(OH)CH$_3$ | 2 |

In the Table, introduction sites of respective substituents of ($R_1$) and ($R_2$) are in an irregular order within the β-position substitution type [showing isomers represented by formulae (a)-1 to (a)-4].
The values of k and l are a charging ratio (eq./eq.) of the phthalonitrile derivative used in the synthesis of the phthalocyanine derivative.
The value of k + l is the total number of substituents R in the phthalocyanine mother nucleus.

TABLE 3

$$M-Pc\begin{array}{c}(R_1)_k\\(R_2)_l\\(R_3)_m\end{array}$$

| Compound No. | M | $R_1$ | k | $R_2$ | l | $R_3$ | m |
|---|---|---|---|---|---|---|---|
| 111 | Cu | —SO$_3$Li | 1 | —SO$_2$NH$_2$ | 2 | —SO$_2$NH(CH$_2$)$_2$NH—[triazine(NH$_2$)]—NH—[phenyl(LiO$_3$S)(SO$_3$Li)] | 1 |
| 112 | Ni | —SO$_3$Li | 1 | —SO$_2$NH$_2$ | 2 | —SO$_2$NH(CH$_2$)$_2$NH—[triazine(NH$_2$)]—NH—[phenyl(LiO$_3$S)(SO$_3$Li)] | 1 |
| 113 | Zn | —SO$_3$Li | 1 | —SO$_2$NH$_2$ | 2 | —SO$_2$NH(CH$_2$)$_2$NH—[triazine(NH$_2$)]—NH—[phenyl(LiO$_3$S)(SO$_3$Li)] | 1 |
| 114 | Cu | —SO$_3$Li | 2 | —SO$_2$NH$_2$ | 1 | —SO$_2$NH—(CH$_2$)$_2$—SO$_2$NH—CH$_2$CH(OH)CH$_3$ | 1 |
| 115 | Cu | —SO$_3$Li | 2 | —SO$_2$NH$_2$ | 1 | —SO$_2$NH(CH$_2$)$_2$SO$_2$NHCH$_2$CH(OH)CH$_2$OH | 1 |

In the Table, introduction sites of respective substituents of (R$_1$), (R$_2$) and (R$_3$) are in an irregular order within the β-position substitution type [showing isomers represented by formulae (a)-1 to (a)-4].
The values of k, l and m are a charging ratio (eq./eq./eq.) of the phthalonitrile derivative used in the synthesis of the phthalocyanine derivative.
The value of k + l + m is the total number of substituents R in the phthalocyanine mother nucleus.

In Table 4 below, formula (XX-4) represents a (k+l+m+n)-valent phthalocyanine nucleus (the introduction site of the substituent R is the β-position substitution type defined in the present invention), R represents R$_1$ and/or R$_2$ and/or R$_3$ and/or R$_4$, t represents a number of t=1 or 2, k represents a number of 0<k<8, and l represents a number of 0<l<8, m represents a number of 0<m<8, and n represents a number of 0<n<8, provided that k, l, m and n each represents a number satisfying 4≦k+l+m+n≦8.

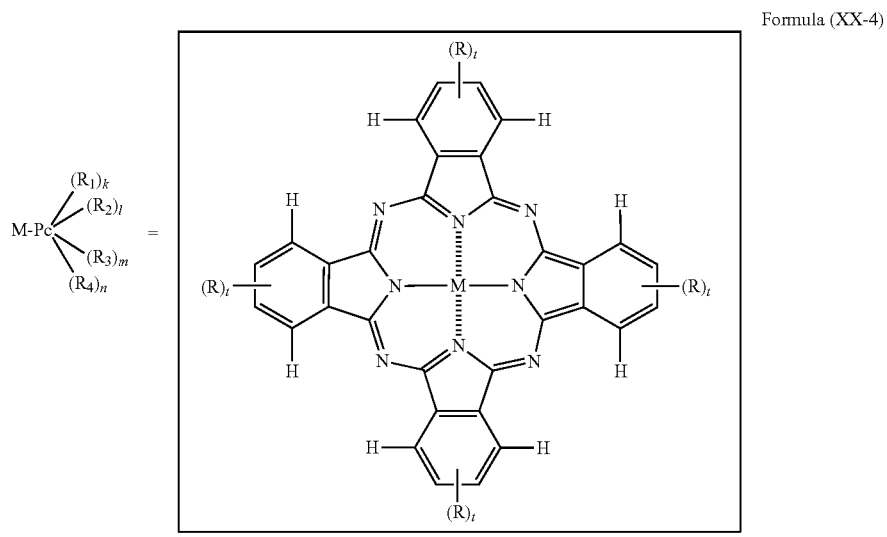

Formula (XX-4)

TABLE 4

| Compound No. | M | $R_1$ | k | $R_2$ | l | $R_3$ | m | $R_4$ | n |
|---|---|---|---|---|---|---|---|---|---|
| 116 | Cu | —$SO_3Li$ | 1 | —$SO_2NH_2$ | 1 | —$SO_2NHCH_2CHCH_2OH$ \| $OH$ | 1 | —$SO_2NH$—$(CH_2)_2$—$SO_3Li$ | 1 |
| 117 | Cu | —$SO_3Li$ | 1 | —$SO_2NH_2$ | 1 | —$SO_2NHCH_2CHCH_2OH$ \| $OH$ | 1 | —$SO_2NH$—$(CH_2)_2$—$SO_3Li$ | 1 |
| 118 | Cu | —$SO_3Li$ | 1 | —$SO_2NH_2$ | 1 | —$SO_2NHCH_2CHCH_3$ \| $OH$ | 1 | —$SO_2NH$—C$_6$H$_4$—$SO_3Li$ | 1 |
| 119 | Ni | —$SO_3Li$ | 1 | —$SO_2NH_2$ | 1 | —$SO_2NHCH_2CHCH_3$ \| $OH$ | 1 | —$SO_2NH$—C$_6$H$_4$—$SO_3Li$ | 1 |
| 120 | Zn | —$SO_3Li$ | 1 | —$SO_2NH_2$ | 1 | —$SO_2NHCH_2CHCH_3$ \| $OH$ | 1 | —$SO_2NH$—C$_6$H$_4$—$SO_3Li$ | 1 |

In the Table, introduction sites of respective substituents of ($R_1$), ($R_2$), ($R_3$) and ($R_4$) are in an irregular order within the β-position substitution type [showing isomers represented by formulae (a)-1 to (a)-4].

The values of k, l, m and n are a charging ratio (eq./eq./eq./eq.) of the phthalonitrile derivative used in the synthesis of the phthalocyanine derivative.

The value of k + l + m + n is the total number of substituents R in the phthalocyanine mother nucleus.

The amount of the colorant added is preferably from 0.2 to 10 mass %, more preferably from 0.5 to 7 mass %, and most preferably from 1 to 5 mass %, based on the ink composition.

The guanidine-based compound used together with the colorant in the present invention is described in detail below.

(Guanidine-Based Compound)

The guanidine-based compound for use in the present invention means a compound having a structure of N—C (=N)—N.

The guanidine-based compound is preferably a compound represented by formula (1).

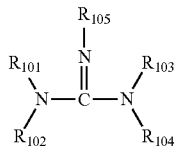

Formula (1)

wherein $R_{101}$, $R_{102}$, $R_{103}$ and $R_{104}$ each independently represents a hydrogen atom, an alkyl group, an alkoxy group, an aryl group, a heterocyclic group or an amino group, $R_{105}$ represents a hydrogen atom, an alkyl group, an alkoxy group, an aryl group or a heterocyclic group, and these alkyl group, alkoxy group, aryl group, heterocyclic group and amino group each may be substituted or unsubstituted. $R_{101}$ to $R_{104}$ are preferably a hydrogen atom, an alkyl group or an aryl group. $R_{105}$ is preferably a hydrogen atom, alkyl group or an aryl group.

The alkyl group is preferably an alkyl group having a carbon number of 1 to 12, more preferably an alkyl group having a carbon number of 1 to 6.

The alkoxy group is preferably an alkoxy group having a carbon number of 1 to 12, more preferably an alkoxy group having a carbon number of 1 to 6.

The aryl group is preferably an aryl group having a carbon number of 6 to 18, more preferably an aryl group having a carbon number of 6 to 10.

Examples of the heterocyclic group include a furyl group, a pyridyl group, a pyrimidyl group, a pyrrolyl group, a pyrrolinyl group, a pyrrolidyl group, a dioxolyl group, a pyrazolyl group, a pyrazolynyl group, a pyrazolidyl group, an imidazolyl group, an oxazolyl group, a thiazolyl group, an oxadiazolyl group, a triazolyl group, a thiadiazolyl group, a pyryl group, a pyridyl group, a piperidyl group, a dioxanyl group, a morpholyl group, a pyridazyl group, a pyrazyl group, a piperazyl group, a triazyl group and a trithianyl group.

The alkyl group, alkoxy group, aryl group and heterocyclic group represented by $R_{101}$ to $R_{105}$ include those where the hydrogen atom is further substituted by another arbitrary substituent. Examples of such a substituent include a halogen atom such as chlorine, a nitro group, an amino group, a carboxyl group, a hydroxyl group, a carbamoyl group, an amidino group, a guanidino group and an aryloxy group (the aryl moiety may be further substituted by a substituent enumerated here). Two or more kinds of these substituents may be substituted in the same molecule. Also, in the amino group, carbamoyl group, amidino group and guanidino group, the hydrogen atom may be substituted by an alkyl group, alkoxy group, aryl group or heterocyclic group represented by $R_{101}$ to $R_{105}$.

In the amino group represented by $R_{101}$ to $R_{104}$, the hydrogen atom may be substituted by an alkyl group, alkoxy group, aryl group or heterocyclic group represented by $R_{101}$ to $R_{105}$.

The guanidine-based compound may be in the form of a salt or a metal complex. Examples thereof include hydrochloride, nitrate, phosphate, sulfamate, carbonate and acetate.

The guanidine-based compound include those shown below, and these may be used individually or in combination, but the present invention is not limited thereto.

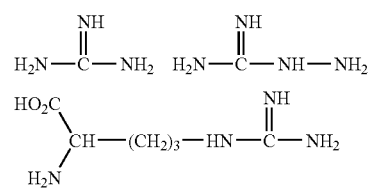

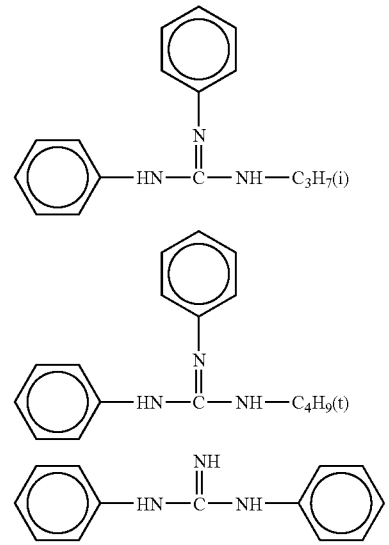

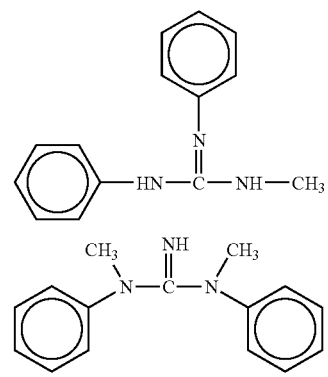

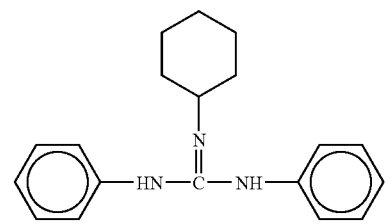

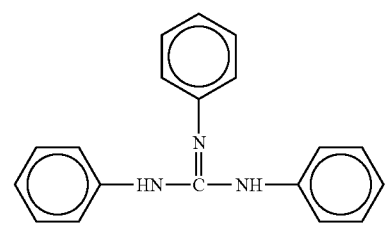

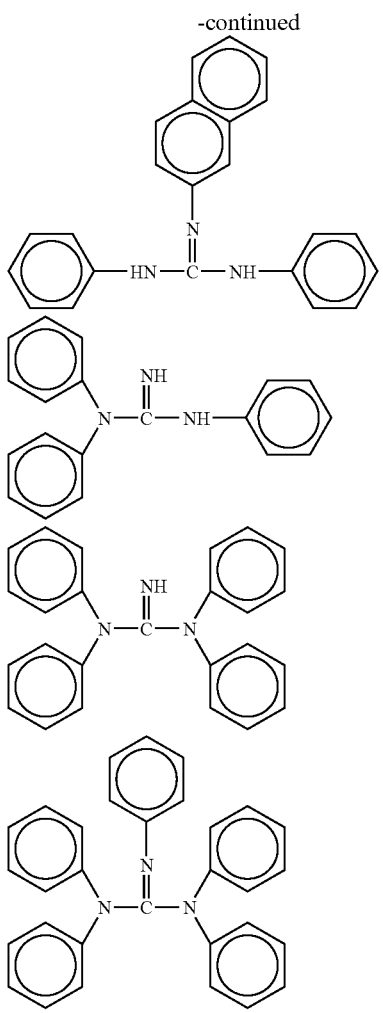

As for the synthesis method of the compound represented by formula (1), the compound can be obtained, for example, by passing through at least a step of causing ammonia to act on a hydrochloride of the corresponding imino ether.

The guanidine-based compound may be a polymer having an N—C(=N)—N structure. Such a polymer includes, but is not limited to, a compound containing a repeating unit represented by the following formula (2-Aa), (2-Ab) or (2-Ac). The compound containing this repeating unit may be an oligomer. Also, the compound containing a repeating unit represented by formula (2-Ac) may be a monomer. These compounds are preferably a salt with an acid.

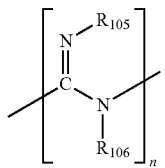

Formula (2-Aa)

In formula (2-Aa), $R_{105}$ has the same meaning as above, $R_{106}$ represents any one of $R_{101}$, $R_{102}$, $R_{103}$ and $R_{104}$, and the n-number of $R_{105}$'s or $R_{106}$'s may be the same or different. n is an integer of 2 or more and is preferably an integer of 2 to 30, more preferably from 2 to 15.

The compound containing a repeating unit represented by formula (2-Aa) may be a homopolymer or a copolymer with another repeating unit such as azetidinium. The terminal structure may be appropriately selected but is preferably a hydrogen atom, an alkyl group, an alkoxy group, an aryl group, a heterocyclic group or an amino group.

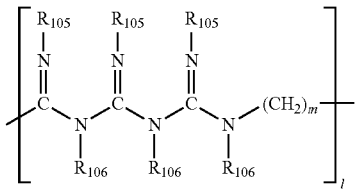

Formula (2-Ab)

In formula (2-Ab), $R_{105}$ and $R_{106}$ have the same meanings as above, and the l-number of $R_{105}$'s or $R_{106}$'s may be the same or different. l represents an integer of 2 or more and is preferably an integer of 2 to 10, more preferably from 2 to 5. m represents an integer of 1 or more and is preferably an integer of 1 to 6, more preferably from 1 to 3. The compound containing a repeating unit represented by formula (2-Ab) may be a homopolymer or a copolymer with another repeating unit such as azetidinium. The terminal structure may be appropriately selected but is preferably a hydrogen atom, an alkyl group, an alkoxy group, an aryl group, a heterocyclic group or an amino group.

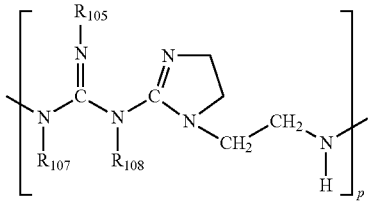

Formula (2-Ac)

In formula (2-Ac), $R_{105}$ has the same meanings as above, $R_{107}$ has the same meaning as $R_{101}$ or $R_{102}$, $R_{108}$ has the same meaning as $R_{104}$ or $R_{105}$, and the p-number of $R_{103}$'s, $R_{107}$'s or $R_{108}$'s may be the same or different. p represents an integer of 1 or more and is preferably an integer of 1 to 10, more preferably from 1 to 5. The compound containing a repeating unit represented by formula (2-Ac) may be a homopolymer or a copolymer with another repeating unit such as azetidinium. The terminal structure may be appropriately selected but is preferably a hydrogen atom, an alkyl group, an alkoxy group, an aryl group, a heterocyclic group or an amino group.

The total amount added of at least one kind of a guanidine-based compound is preferably from 0.1 to 10 mass %, more preferably from 0.3 to 7 mass %, and most preferably from 0.5 to 5 mass %, based on the ink composition.

The colorant/guanidine-based compound (mass ratio) is preferably from 0.01 to 100, more preferably from 0.1 to 50, still more preferably from 0.3 to 10.

The colorless water-soluble planar compound having more than ten delocalized π-electrons within one molecule, which is used together with the colorant in the present invention, is described below.

When the number of π-electrons constituting a delocalized π-electron system is increased and the π-electron system is broadened, the ink composition comes to have absorption in the visible region in many cases. The term "colorless" as used in the present invention includes a state that the compound is very slightly colored within the range of not affecting the image. The compound may be a fluorescent compound but is preferably a compound having no fluorescence, more preferably a compound where λmax having the absorption peak on the longest wave side is 350 nm or less, preferably 320 nm or less, and at the same time, the molar absorption coefficient is 10,000 or less.

The compound for use in the present invention has more than ten delocalized π-electrons within one molecule. The number of π-electrons is not particularly limited in its upper limit but is preferably 80 or less, more preferably 50 or less, still more preferably 30 or less. Also, more than ten π-electrons may form one large delocalized system but may form two or more delocalized systems. In particular, a compound having two or more aromatic rings within one molecule is preferred. The aromatic ring may be an aromatic hydrocarbon ring or an aromatic hetero ring containing a heteroatom or may be ring-condensed to form one aromatic ring. Examples of the aromatic ring include benzene, naphthalene, anthracene, pyridine, pyrimidine, pyrazine and triazine.

The water-soluble planar compound for use in the present invention is preferably a compound which dissolves in an amount of at least 1 g, more preferably 5 g of more, most preferably 10 g or more, per 100 g of water at 20° C.

In the case of a compound having two or more aromatic rings within one molecule, the compound preferably has at least two solubilizing groups bonded to the aromatic ring in the molecule. Examples of the useful solubilizing group include, but are not limited to, a sulfo group, a carboxyl group, a hydroxy group, a phosphono group, a carbonamido group, a sulfonamide group, a quaternary ammonium salt and other groups known to one skilled in the art. Among these, a sulfo group and a carboxyl group are preferred, and a sulfo group is most preferred.

The maximum number of solubilizing groups in the molecule is limited only by the number of usable positions of the substituent, but for the practical purpose, it may suffice if ten same or different solubilizing groups are present in the molecule. The counter cation of the solubilizing group is not limited. The counter cation includes an alkali metal, ammonium and an organic cation (e.g., tetramethylammonium, guanidinium, pyridinium). Among them, an alkali metal and ammonium are preferable, lithium, sodium, potassium and ammonium are especially preferable, and lithium, sodium, ammonium are the most preferable.

Specific examples of the compound include the compounds described in JP-A-63-55544, JP-A-3-146947, JP-A-3-149543, JP-A-2001-201831, JP-A-2002-139822, JP-A-2002-196460, JP-A-2002-244257, JP-A-2002-244259, JP-A-2002-296743, JP-A-2002-296744, JP-A-2003-255502, JP-A-2003-307823, JP-A-2004-4500 and JP-A-2004-170964.

Above all, a compound represented by the following formula (3) is preferred.
Formula (3):

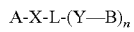

In the formula, A, L and B each independently represents an aromatic group (including an aryl group and an aromatic heterocyclic group). X and Y each independently represents a divalent linking group. n represents 0 or 1. The aromatic group may be monocyclic or a condensed ring. The divalent linking group is an alkylene group, an alkenylene group, —CO—, —SO$_n$— (n is 0, 1 or 2), —NR— (R represents a hydrogen atom, an alkyl group, an aryl group or a heterocyclic group), —O—, or a divalent group comprising a combination of these linking groups. However, the compound represented by formula (3) contains at least one ionic hydrophilic group selected from a sulfo group, a carboxyl group, a phenolic hydroxyl group and a phosphono group. The ionic hydrophilic group may be in the form of a salt, and the counter cation thereof is not limited. The counter cation includes an alkali metal, ammonium and an organic cation (e.g., tetramethylammonium, guanidinium, pyridinium) and is preferably an alkali metal or ammonium, more preferably lithium, sodium, potassium or ammonium, and most preferably lithium, sodium or ammonium.

The compound represented by formula (3) may have a substituent other than an ionic hydrophilic group, and specific examples of the substituent include an alkyl group, an aryl group, an aralkyl group, a heterocyclic group, an alkoxy group, an aryloxy group, a hydroxyl group, an amino group (including an anilino group and a heterocyclic amino group), an acyl group, an acylamino group, a ureido group, a halogen atom, a sulfamoyl group, a carbamoyl group, a sulfonamido group, a sulfonyl group, a sulfenyl group and a sulfinyl group. These groups each may further have a substituent. Among the compounds of formula 3, a compound where n=1 or where at least one of A, L and B is an aromatic hetero ring is preferred, and a compound containing from two to four ionic hydrophilic groups is more preferred.

The amount used of the colorless water-soluble planar compound having more than ten delocalized π-electrons within one molecule for use in the present invention is preferably from 0.01 to 10 mass %, more preferably from 0.1 to 7.0 mass %, and most preferably from 0.5 to 5.0 mass %, based on the ink.

The colorant/planar compound (mass ratio) is preferably from 0.02 to 1,000, more preferably from 0.1 to 100, still more preferably from 0.2 to 50.

If the amount used is small, the ability of preventing bronze/improving fastness to ozone gas may be insufficient.

If the amount used is large, the ejection property may be worsened.

The operation mechanism by which the compound of the present invention prevents bronze is not clearly known, but it is considered that the compound acts as a disaggregating agent of eliminating aggregation by causing the π-electron to exert a stronger interaction on the coloring matter aggregated (associated) by the π-electron interaction between molecules of the coloring matter and the bronze phenomenon is thereby improved. In order to intrude between aggregated coloring matters or exert a strong π-electron interaction on the coloring matter present in the surface of the coloring matter aggregate, it is important that the disaggregating agent is planar and the π-electron system is largely broadened. Furthermore, in order to cause no precipitation of the disaggregating agent itself or a complex formed by the coloring matter and the disaggregating agent, it is also important that the disaggregating agent has sufficiently high solubility. The necessary number of π-electrons greatly varies depending on the coloring matter used for the inkjet ink, but since the coloring matter used for the inkjet ink has a largely extended planar structure for increasing the fixing property as represented by the direct dye, it is presumed that the disaggregating agent needs to be a colorless water-soluble planar compound having a system of more than ten delocalized π-electrons within one molecule. In addition, the complex formed by the disaggregating agent and the coloring matter takes a form of protecting the coloring matter with the disaggregating agent and therefore, the resistance against ozone gas is also enhanced.

Preferred examples of the compound for use in the present invention include the compounds described in JP-A-2002-139822, JP-A-2002-196460, JP-A-2002-244257, JP-A-2002-244259, JP-A-2002-296743 and JP-A-2002-296744, supra. Representative compounds (disaggregating agent) are set forth below.

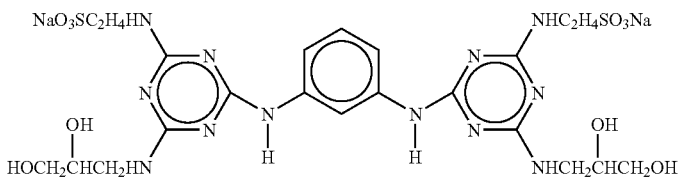
(P-1)
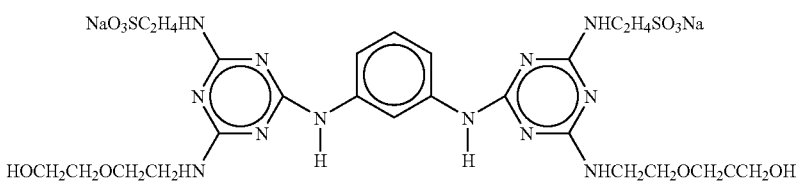
(P-2)
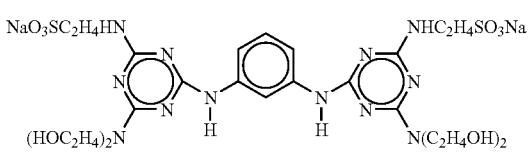
(P-3)
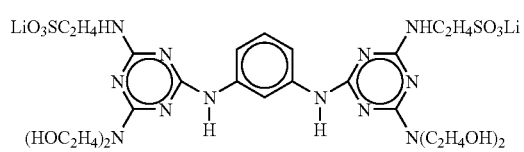
(P-4)
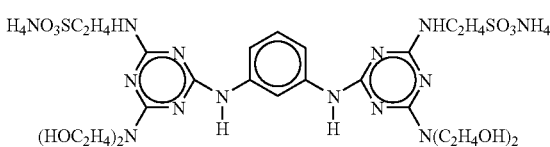
(P-5)
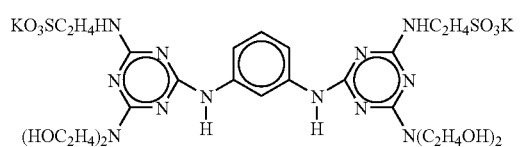
(P-6)
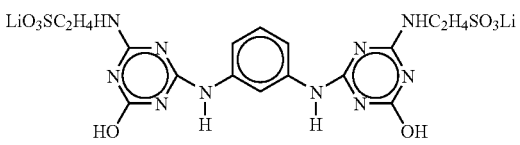
(P-7)
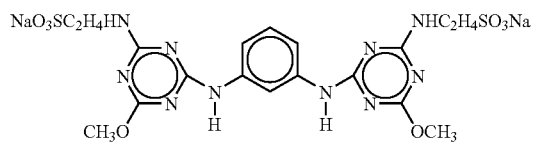
(P-8)
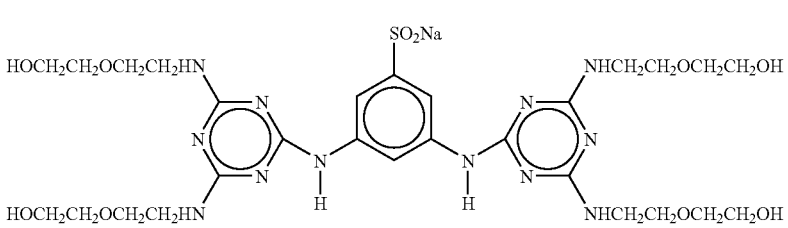
(P-9)
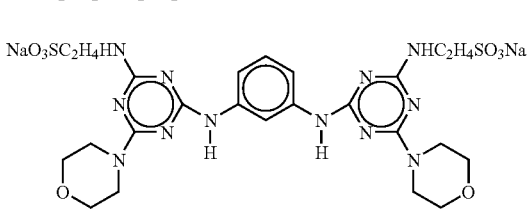
(P-10)
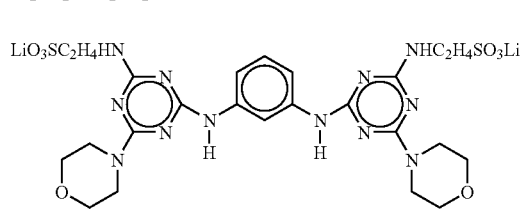
(P-11)
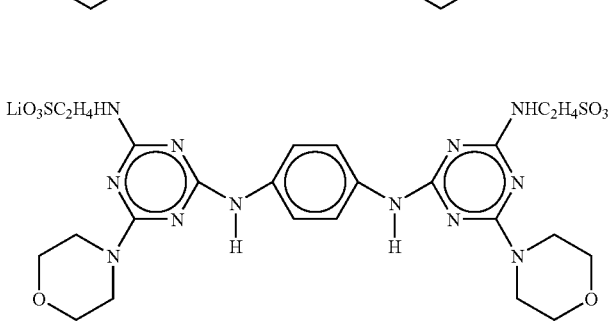
(P-12)

-continued
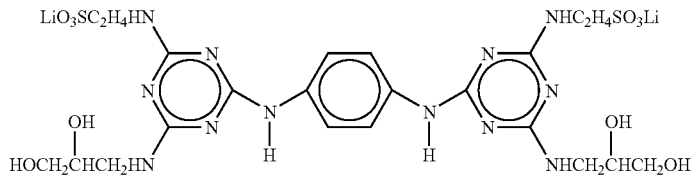
(P-13)
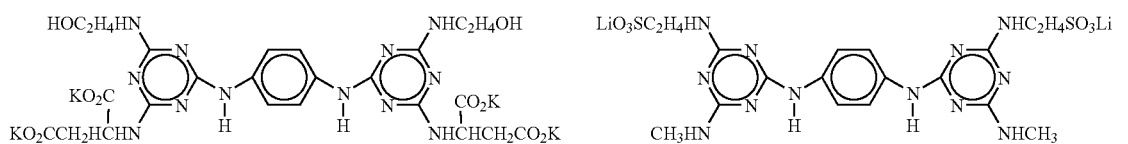
(P-14)
(P-15)
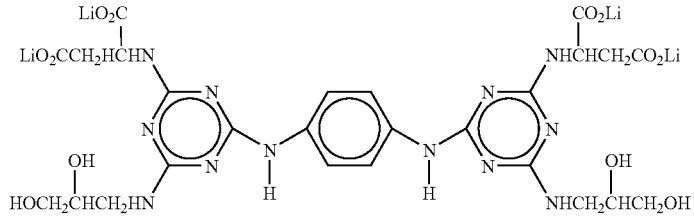
(P-16)
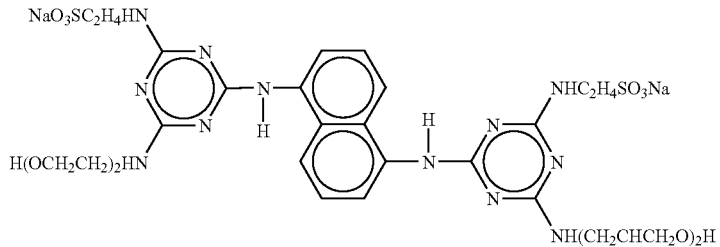
(P-17)
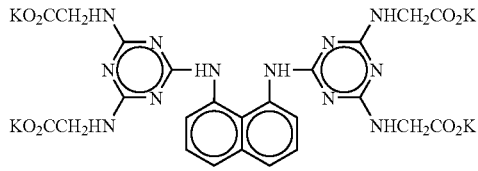
(P-18)
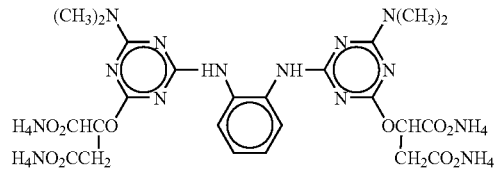
(P-19)
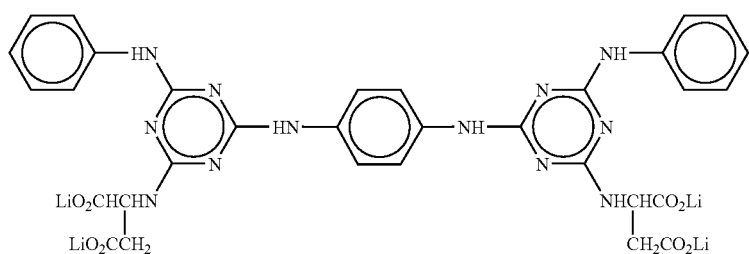
(P-20)
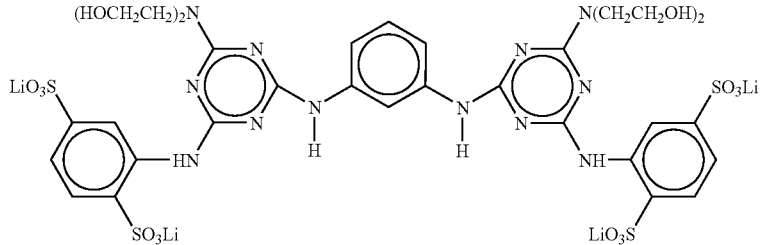
(P-21)

(P-22)
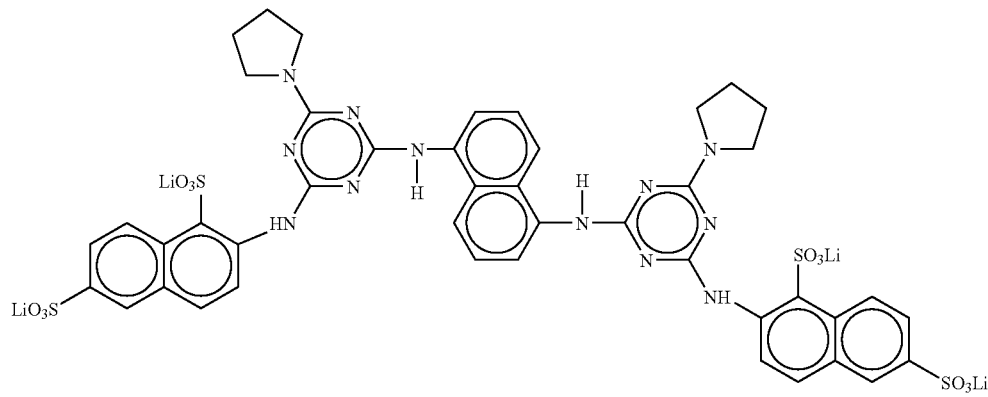
(P-23)
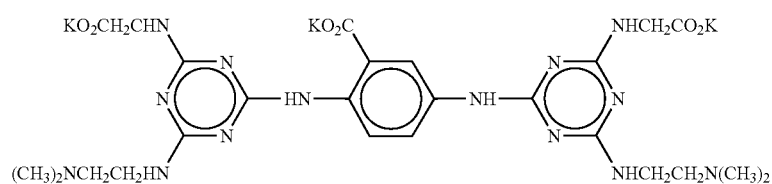
(P-24)
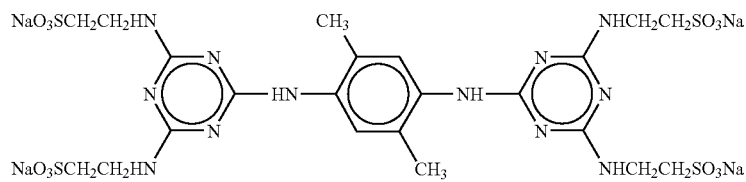
(P-25)
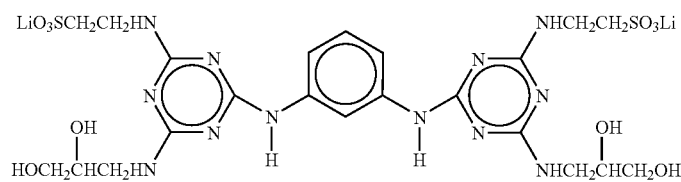
(P-26)
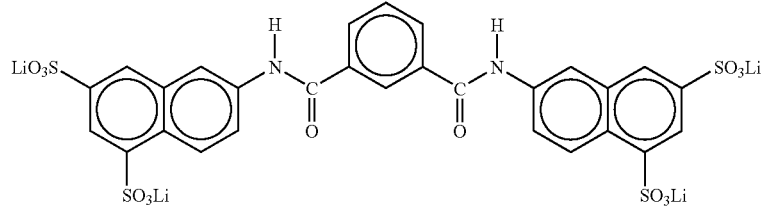
(P-27)
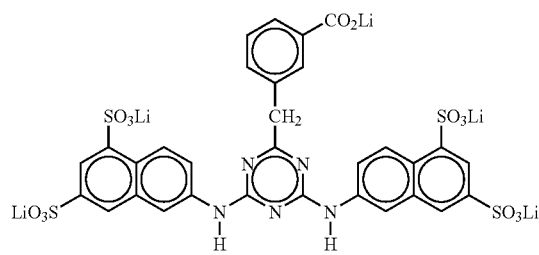
(P-28)
(P-29)
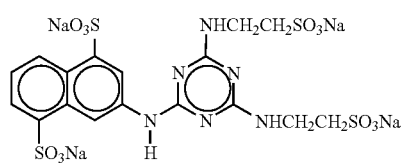
(P-30)
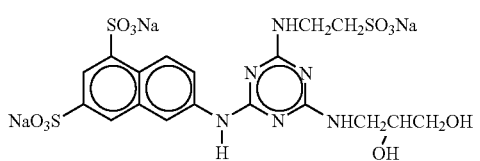

-continued

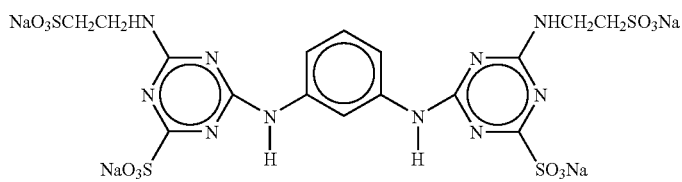

(P-31)

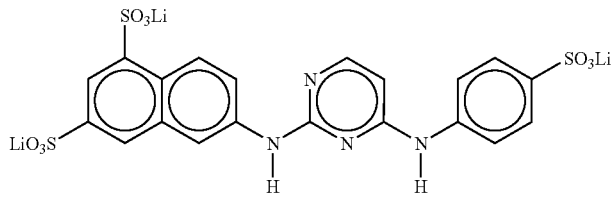

(P-32)

Preferred compounds for use in the present invention can be easily synthesized by referring to, for example, JP-A-2002-139822, supra.

The intended end-usage of the ink composition of the present invention includes an image recording material for forming an image, particularly, a color image. Specific examples thereof include an inkjet recording material which is described in detail later, a heat-sensitive recording material, a pressure-sensitive recording material, a recording material for use with an electrophotographic system, a transfer-type silver halide light-sensitive material, a printing ink and a recording pen. Among these, preferred are an inkjet recording material, a heat-sensitive recording material and a recording material for use with an electrophotographic system, more preferred is an inkjet recording material.

The ink composition of the present invention may also be applied to a dyeing solution for dyeing a color filter used to record/reproduce a color image in a solid-state image sensor (e.g., CCD) or a display (e.g., LCD, PDP), or various fibers.

[Ink]

The ink composition of the present invention means an ink composition comprising at least one colorant of the present invention, water, a guanidine-based compound, and a colorless water-soluble planer compound having more than ten delocalized π-electrons within one molecule.

The ink composition of the present invention may contain a medium except for water and when the medium used is a solvent, the ink composition is suitable particularly as an inkjet recording ink.

The ink composition of the present invention can be produced by using a lipophilic medium or an aqueous medium as the medium and dissolving and/or dispersing the colorant of the present invention therein.

An aqueous medium is preferred. Further, a water-soluble ink composition is preferred.

The ink of the present invention may contain, if desired, other additives within the range of not impairing the effects of the present invention.

Examples of other additives include known additives (described in JP-A-2003-306623) such as drying inhibitor (wetting agent), discoloration inhibitor, emulsification stabilizer, penetration accelerator, ultraviolet absorbent, antiseptic, fungicide, pH adjusting agent, surface tension adjusting agent, defoaming agent, viscosity adjusting agent, dispersant, dispersion stabilizer, rust inhibitor and chelating agent.

In the case of a water-soluble ink, these various additives are added directly to the ink solution. In the case of using an oil-soluble dye in the form of a dispersion, the additives are generally added to the dispersion after the preparation of a dye dispersion but may be added to the oil or aqueous phase during the preparation.

The drying inhibitor is suitably used for the purpose of preventing clogging due to drying of the inkjet ink at the ink ejection port of a nozzle in the inkjet recording system.

The drying inhibitor is preferably a water-soluble organic solvent having a vapor pressure lower than water. Specific examples thereof include polyhydric alcohols as represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of polyhydric alcohol, such as ethylene glycol monomethyl(or ethyl) ether, diethylene glycol monomethyl(or ethyl) ether and triethylene glycol monoethyl(or butyl) ether; heterocyclic rings such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Among these, polyhydric alcohols such as glycerin and diethylene glycol are preferred. These drying inhibitors may be used individually or in combination of two or more thereof. In the ink, the drying inhibitor is preferably contained in an amount of 10 to 50 mass %.

The penetration accelerator is suitably used for the purpose of more successfully penetrating the inkjet recording ink into paper. Examples of the penetration accelerator which can be used include alcohols such as ethanol, isopropanol, butanol, di(tri)ethylene glycol monobutyl ether and 1,2-hexanediol, sodium laurylsulfate, sodium oleate and nonionic surfactants. A sufficiently high effect can be usually obtained by adding from 5 to 30 mass % of the penetration accelerator in the ink. The penetration accelerator is preferably used in an amount of causing no blurring of printed letter or no print through.

The ultraviolet absorbent is used for the purpose of enhancing the preservability of image. Examples of the ultraviolet absorbent which can be used include benzotriazole-base compounds described in JP-A-58-185677, JP-A-61-190537, JP-A-2-782, JP-A-5-197075 and JP-A-9-34057, benzophenone-base compounds described in JP-A-46-2784, JP-A-5-194483 and U.S. Pat. No. 3,214,463, cinnamic acid-based compounds described in JP-B-48-30492 (the term "JP-B" as used herein means an "examined Japanese patent publication"), JP-B-56-21141 and JP-A-10-88106, triazine-base compounds described in JP-A-4-298503, JP-A-8-53427, JP-A-8-239368, JP-A-10-182621 and JP-T-8-501291 (the term "JP-T" as used herein means a "published Japanese translation of a PCT patent application"), compounds described in Research Disclosure No. 24239, and compounds of absorbing ultraviolet light and emitting fluorescent light, so-called fluorescent brightening agents, as represented by a stilbene-based compound and a benzoxazole-based compound.

The discoloration inhibitor is used for the purpose of enhancing the preservability of image. As the discoloration inhibitor, various organic or metal complex-based discoloration inhibitors can be used. Examples of the organic discoloration inhibitor include hydroquinones, alkoxyphenols, dialkoxyphenols, phenols, anilines, amines, indanes, chromans, alkoxyanilines and hetero rings. Examples of the metal complex include a nickel complex and a zinc complex. More specifically, compounds described in patent documents cited in Research Disclosure, Nos. 17643 (Items VII-I to VII-J), 15162, 18716 (page 650, left column), 36544 (page 527), 307105 (page 872) and 15162, and compounds included in formulae of representative compounds and in exemplary compounds described in JP-A-62-215272 (pages 127 to 137) can be used.

Examples of the fungicide include sodium dehydroacetate, sodium benzoate, sodium pyridinethione-1-oxide, ethyl p-hydroxybenzoate, 1,2-benzisothiazolin-3-one and salts thereof. In the ink, the fungicide is preferably used in an amount of 0.02 to 1.00 mass %.

As the pH adjusting agent, a neutralizer (e.g., organic base, inorganic alkali) described above may be used. The pH adjusting agent is used for the purpose of enhancing the storage stability of the inkjet recording ink. The pH adjusting agent is preferably added so that the inkjet recording ink can be used in summer, that is, can have a pH of 6 to 10, more preferably a pH of 7 to 10.

Examples of the surface tension adjusting agent include nonionic, cationic and anionic surfactants. The surface tension of the inkjet recording ink of the present invention is preferably from 25 to 70 mPa·s, more preferably from 25 to 60 mPa·s. Also, the viscosity of the inkjet recording ink of the present invention is preferably 30 mPa·s or less. The viscosity is more preferably adjusted to 20 mPa·s or less.

Preferred examples of the surfactant include an anionic surfactant such as fatty acid salt, alkylsulfuric ester salt, alkylbenzenesulfonate, alkylnaphthalenesulfonate, dialkylsulfosuccinate, alkylphosphoric ester salt, naphthalenesulfonic acid formalin condensate and polyoxyethylenealkylsulfuric ester salt, and a nonionic surfactant such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer.

Also, SURFYNOLS (produced by Air Products & Chemicals), which are an acetylene-based polyoxyethylene oxide surfactant, may be preferably used, Furthermore, an amine oxide-type amphoteric surfactant such as N,N-dimethyl-N-alkylamine oxide is also preferred. In addition, those described as the surfactant in JP-A-59-157636 (pages (37) to (38)) and Research Disclosure, No. 308119 (1989) may also be used.

A defoaming agent such as fluorine- or silicone-base compound or chelating agent as represented by EDTA may be also used, if desired.

In the case of dispersing the colorant for use in the present invention in an aqueous medium, it is preferred that a colored fine particle containing a coloring matter and an oil-soluble polymer is dispersed in an aqueous medium as described in JP-A-11-286637, JP-A-2001-240763, JP-A-2001-262039 and JP-A-2001-247788, or the colorant of the present invention dissolved in a high-boiling point organic solvent is dispersed in an aqueous medium as described in JP-A-2001-262018, JP-A-2001-240763, JP-A-2001-335734 and JP-A-2002-80772.

As regards the specific method for dispersing the colorant of the present invention in an aqueous medium, the oil-soluble polymer, high-boiling point organic solvent and additives used, and the amounts thereof, those described in the patent publications above may be preferably employed. Alternatively, the colorant in the solid form may be directly dispersed into a fine particle state.

At the time of dispersing the colorant, a dispersant and a surfactant may be used. As for the dispersing device, a simple stirrer or impeller stirring system, an inline stirring system, a mill system (e.g., colloid mill, ball mill, sand mill, attritor, roll mill, agitator mill), an ultrasonic wave system, and a high-pressure emulsion dispersion system (a high-pressure homogenizer; specific examples of the commercially available device include a Gaulin homogenizer, Microfluidizer and DeBEE 2000) may be employed.

Details of the preparation process of the inkjet recording ink are described, other than the patent publications above, in JP-A-5-148436, JP-A-5-295312, JP-A-7-97541, JP-A-7-82515, JP-A-7-118584, JP-A-11-286637 and JP-A-2001-271003, and these can be utilized also in the preparation of the inkjet recording ink of the present invention.

The aqueous medium mainly comprises water and if desired, a mixture where a water-miscible organic solvent is added can be used. Examples of the water-miscible organic solvent include alcohols (e.g., methanol, ethanol, propanol, isopropanol, butanol, isobutanol, sec-butanol, tert-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine) and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). These water-miscible organic solvents may be used in combination of two or more thereof.

In the inkjet recording ink of the present invention, the colorant is preferably contained in an amount of 0.1 to 10 parts by mass per 100 parts by mass of the inkjet recording ink.

In the inkjet recording ink of the present invention, another coloring agent may be used in combination with the colorant of the present invention represented by formula (I), (II), (III) or (IV).

In the case of using two or more colorants in combination, the total content of colorants is preferably in the above-described range.

In the case of using another colorant in combination with the colorant represented by formula (I), (II), (III) or (IV), the another colorant is preferably, for example, a phthalocyanine derivative represented by the following formula (V):

Formula (V)

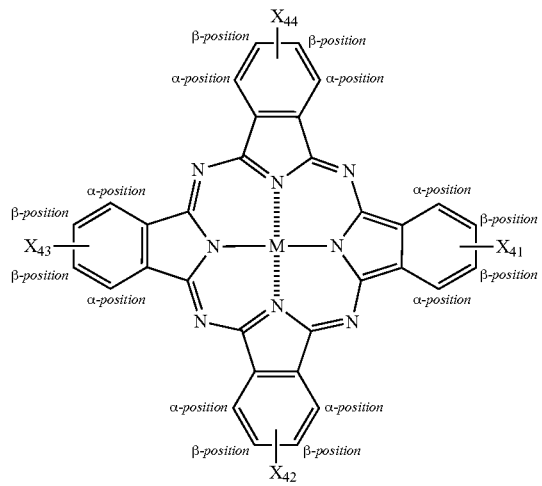

In formula (V), M has the same meaning as M in formula (III), and preferred examples are also the same.

$X_{41}$, $X_{42}$, $X_{43}$ and $X_{44}$ each independently represents a substituent selected from —$SO_2NR_2R_3$, —$CONR_2R_3$, —$CO_2$—$R_1$, —CO—$R_1$, a sulfo group and a salt thereof, a carboxyl group and a salt thereof, and a phosphono group and a salt thereof, and $R_1$, $R_2$ and $R_3$ have the same meanings as $R_1$, $R_2$ and $R_3$ in formula (I), provided that at least one of $X_{41}$, $X_{42}$, $X_{43}$ and $X_{44}$ is itself an ionic hydrophilic group or has an ionic hydrophilic group as a substituent.

In the benzene ring of the phthalocyanine mother nucleus represented by formula (V), the side closer to the ring-condensed portion is denoted as an α-position and the side farther therefrom is denoted as a β-position, but formula (V) indicates that the positions to which $X_{41}$, $X_{42}$, $X_{43}$ and $X_{44}$ are substituted each is independently not specified as either the α-position or the β-position.

Specific examples of the colorant represented by formula (V), which can be used in combination with the colorant for use in the ink composition of the present invention, are set forth below, but the present invention is not limited to these specific examples.

(Colorant A Used in Combination)

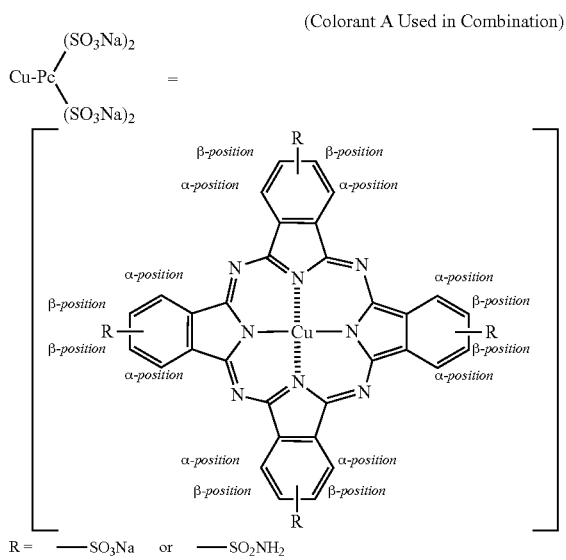

(Colorant B Used in Combination)

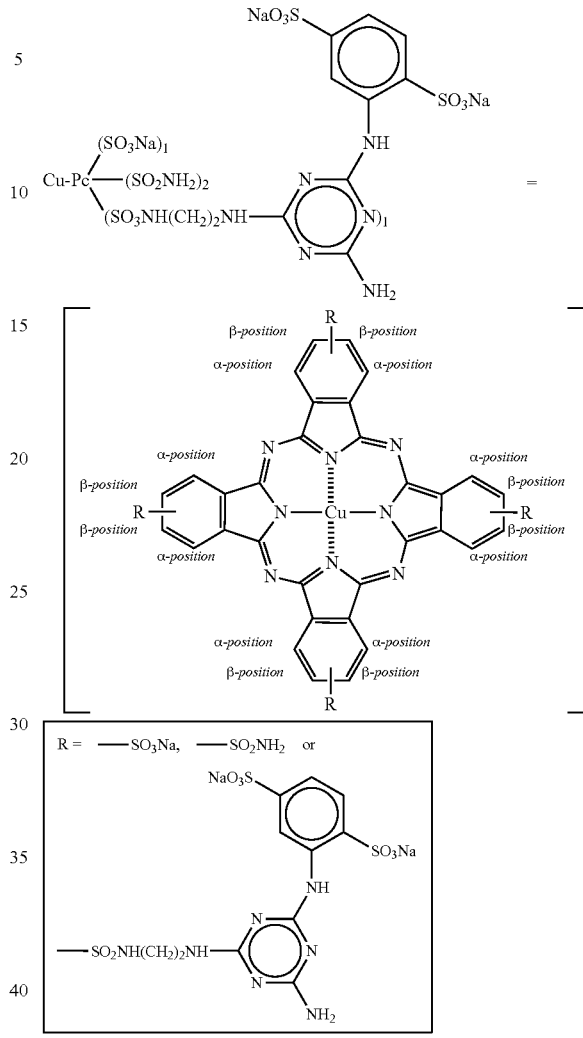

The inkjet recording ink of the present invention can be used not only for the formation of a monochromatic image but also for the formation of a full color image.

For forming a full color image, a magenta color tone ink, a cyan color tone ink and a yellow color tone ink can be used. Also, for adjusting the color tone, a black color tone ink may be further used.

In these inks, other coloring materials (dye or pigment) may also be used in addition to the colorant according to the present invention so as to enhance the image reproducing performance.

The yellow dye which can be used together with the colorant of the present invention may be an arbitrary yellow dye. Examples thereof include an aryl- or heteryl-azo dye having phenols, naphthols, anilines, hetero rings (e.g., pyrazolone, pyridone), open chain-type active methylene compounds or the like as the coupling component (hereinafter referred to as a "coupler component"); an azomethine dye having open chain-type active methylene compounds or the like as the coupler component; a methine dye such as benzylidene dye and monomethine oxonol dye; and a quinone-based dye such as naphthoquinone dye and anthraquinone dye. Other examples of the dye species include a quinophthalone dye, a nitro.nitroso dye, an acridine dye and an acridinone dye.

The magenta dye which can be used may be an arbitrary magenta dye. Examples thereof include an aryl- or heteryl-azo dye having phenols, naphthols, anilines or the like as the coupler component; an azomethine dye having pyrazolones, pyrazolotriazoles or the like as the coupler component; a methine dye such as arylidene dye, styryl dye, merocyanine dye, cyanine dye and oxonol dye; a carbonium dye such as diphenylmethane dye, triphenylmethane dye and xanthene dye; a quinone dye such as naphthoquinone, anthraquinone and anthrapyridone; and a condensed polycyclic dye such as dioxazine dye.

The cyan dye which can be used may be an arbitrary cyan dye. Examples thereof include an aryl- or heteryl-azo dye having phenols, naphthols, anilines or the like as the coupler component; an azomethine dye having phenols, naphthols, hetero rings (e.g., pyrrolotriazole) or the like as the coupler component; a polymethine dye such as cyanine dye, oxonol dye and merocyanine dye; a carbonium dye such as diphenylmethane dye, triphenylmethane dye and xanthene dye; a phthalocyanine dye except for the phthalocyanine derivatives in the invention; an anthraquinone dye; and an indigo.thioindigo dye.

These dyes may be a dye which provides a yellow, magenta or cyan color for the first time when a part of the chromophore is dissociated. In this case, the counter cation may be an inorganic cation such as alkali metal and ammonium, an organic cation such as pyridinium and quaternary ammonium salt, or a polymer cation having such a cation in a partial structure.

Examples of the black coloring material which can be used include dis-azo, tris-azo and tetra-azo dyes and a dispersion of carbon black.

[Inkjet Recording Method]

In the inkjet recording method of the present invention, an energy is supplied to the above-described inkjet recording ink and thereby an image is formed on a known image-receiving material, namely, plain paper, resin coated paper, inkjet special paper described, for example, in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597 and JP-A-10-337947, film, electrophotographic common paper, cloth, glass, metal, ceramic or the like.

At the formation of an image, a polymer latex compound may be used in combination for the purpose of giving glossiness or water resistance or improving the weather resistance.

The timing of imparting the latex compound to the image-receiving material may be before, after or simultaneous with the addition of the colorant. Accordingly, the site to which the polymer latex is added may be in the image-receiving paper or ink, or a liquid material of the polymer latex alone may be prepared and used. More specifically, the methods described in JP-A-2002-166638, JP-A-2002-121440, JP-A-2002-154201, JP-A-2002-144696, JP-A-2002-80759, JP-A-2002-187342 and JP-A-2002-172774 may be preferably used.

The recording paper and recording film which are used in performing the inkjet printing by using the ink of the present invention are described below.

The support which can be used for the recording paper or film is produced, for example, from a chemical pulp such as LBKP and NBKP, a mechanical pulp such as GP, PGW, RMP, TMP, CTMP, CMP and CGP, or a waste paper pulp such as DIP, by mixing, if desired, conventionally known additives such as pigment, binder, sizing agent, fixing agent, cation agent and paper strength increasing agent, and then sheeting the mixture by using various devices such as Fourdrinier paper machine and cylinder paper machine. Other than these supports, synthetic paper or plastic film may be used. The thickness of the support is preferably from 10 to 250 µm, and the basis weight is preferably from 10 to 250 g/m$^2$. An ink-receiving layer and a backcoat layer may be provided on the support as it is or after providing a size press or anchor coat layer by using starch, polyvinyl alcohol or the like, an ink-receiving layer and a backcoat layer may be provided. The support may be further subjected to a flattening treatment by a calendering device such as machine calender, TG calender and soft calender. The support for use in the present invention is preferably paper or plastic film of which both surfaces are laminated with a polyolefin (for example, polyethylene, polystyrene, polyethylene terephthalate, polybutene or a copolymer thereof). In the polyolefin, a white pigment (e.g., titanium oxide, zinc oxide) or a tinting dye (e.g., cobalt blue, ultramarine, neodymium oxide) is preferably added.

The ink-receiving layer provided on the support contains a pigment and an aqueous binder. The pigment is preferably a white pigment. Examples of the white pigment include an inorganic white pigment such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and an organic pigment such as styrene-based pigment, acryl-based pigment, urea resin and melamine resin. The white pigment contained in the ink-receiving layer is preferably a porous inorganic pigment, more preferably a synthetic amorphous silica or the like having a large pore area. The synthetic amorphous silica may be either a silicic acid anhydride obtained by a dry production process or a silicic acid hydrate obtained by a wet production process but is preferably a silicic acid hydrate.

Examples of the aqueous binder contained in the ink-receiving layer include a water-soluble polymer such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide and polyalkylene oxide derivative, and a water-dispersible polymer such as styrene butadiene latex and acryl emulsion. These aqueous binders may be used individually or in combination of two or more thereof. Among these, polyvinyl alcohol and silanol-modified polyvinyl alcohol are preferred in the present invention in view of adhesion to the pigment and separation resistance of the ink-receiving layer.

The ink-receiving layer may contain a mordant, a water-proofing agent, a light fastness enhancer, a surfactant and other additives in addition to the pigment and the aqueous binder.

The mordant added to the ink-receiving layer is preferably immobilized and for this purpose, a polymer mordant is preferably used.

The polymer mordant is described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236 and U.S. Pat. Nos.

2,484,430, 2,548,564, 3,148,061, 3,309,690, 4,115,124, 4,124,386, 4,193,800, 4,273,853, 4,282,305 and 4,450,224. An image-receiving material containing the polymer mordant described in JP-A-1-161236 (pages 212 to 215) is particularly preferred. When the polymer mordant described in this patent publication is used, an image having excellent image quality can be obtained and at the same time, light fastness of the image is improved.

The water-proofing agent is effective for forming a water-resistant image. The water-proofing agent is preferably a cationic resin. Examples of the cationic resin include polyamidopolyamine epichlorohydrin, polyethyleneimine, polyaminesulfone, poly-dimethyldiallylammonium chloride, cation polyacrylamide and colloidal silica. Among these cationic resins, polyamidopolyamine epichlorohydrin is preferred. The cationic resin content is preferably from 1 to 15 mass %, more preferably from 3 to 10 mass %, based on the entire solid content of the ink-receiving layer.

Examples of the light fastness enhancer include zinc sulfate, zinc oxide, a hindered amine-based antioxidant and a benzophenone-based or benzotriazole-based ultraviolet absorbent. Among these, zinc sulfate is preferred.

The surfactant functions as a coating aid, a releasability improver, a slipperiness improver or an antistatic agent. The surfactant is described in JP-A-62-173463 and JP-A-62-183457. In place of the surfactant, an organofluoro compound may be used. The organofluoro compound is preferably hydrophobic. Examples of the organofluoro compound include a fluorine-containing surfactant, an oily fluorine-base compound (for example, fluorine oil) and a solid fluorine compound resin (for example, ethylene tetrafluoride resin). The organofluoro compound is described in JP-B-57-9053 (columns 8 to 17), JP-A-61-20994 and JP-A-62-135826. Other examples of the additive added to the ink-receiving layer include a pigment dispersant, a thickener, a defoaming agent, a coloring matter, a fluorescent brightening agent, an antiseptic, a pH adjusting agent, a matting agent and a hardening agent. The ink-receiving layer may be composed of either one layer or two layers.

In the recording paper or film, a backcoat layer may also be provided. The component which can be added to this layer includes a white pigment, an aqueous binder and other components. Examples of the white pigment contained in the backcoat layer include an inorganic white pigment such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrolyzed halloysite, magnesium carbonate and magnesium hydroxide, and an organic pigment such as styrene-based plastic pigment, acryl-based plastic pigment, polyethylene, microcapsule, urea resin and melamine resin.

Examples of the aqueous binder contained in the backcoat layer include a water-soluble polymer such as styrene/maleate copolymer, styrene/acrylate copolymer, polyvinyl alcohol, silanol-modified polyvinyl alcohol, starch, cationized starch, casein, gelatin, carboxymethyl cellulose, hydroxyethyl cellulose and polyvinylpyrrolidone, and a water-dispersible polymer such as styrene butadiene latex and acryl emulsion. Other examples of the component contained in the backcoat layer include a defoaming agent, a foam inhibitor, a coloring matter, a fluorescent brightening agent, an antiseptic and a water-proofing agent.

A polymer latex may be added to a constituent layer (including the backcoat layer) of the inkjet recording paper or film.

The polymer latex is used for the purpose of improving film physical properties, for example, stabilizing the dimension and preventing the curling, adhesion or film cracking. The polymer latex is described in JP-A-62-245258, JP-A-62-1316648 and JP-A-62-110066. When a polymer latex having a low glass transition temperature (40° C. or less) is added to a layer containing a mordant, the layer can be prevented from cracking or curling. The curling can also be prevented by adding a polymer latex having a high glass transition temperature to the backcoat layer.

The ink of the present invention is not limited in the inkjet recording system and is used for a known system, for example, a charge controlling system of jetting out the ink by using an electrostatic induction force, a drop-on-demand system (pressure pulse system) utilizing a vibration pressure of a piezoelectric element, an acoustic inkjet system of converting an electric signal into an acoustic beam, irradiating the beam on the ink and jetting out the ink by using the radiation pressure, and a thermal inkjet system of heating the ink to form a bubble and utilizing the pressure generated. The inkjet recording system includes a system of ejecting a large number of small-volume ink droplets of a so-called photo-ink having a low concentration, a system of improving the image quality by using a plurality of inks having substantially the same color hue but differing in the concentration, and a system of using a colorless transparent ink.

Embodiment

The present invention is described in greater detail below by referring to Examples, but the present invention is not limited thereto.

(Ink C-1)

Ultrapure water having a resistance value of 18 MΩ or more is added to the following components to make 100 g, and the resulting solution is stirred for 1 hour under heating at 30 to 40° C. Thereafter, the solution is filtered under reduced pressure through a microfilter having an average pore size of 0.25 μm to prepare Cyan Ink Solution (C-1).

C-1:

| | |
|---|---|
| Dye a | 4.7 g |
| Urea | 2.4 g |
| Triethylene glycol | 10.7 g |
| Triethylene glycol monobutyl ether | 9.1 g |
| 1,2-Hexanediol | 2.4 g |
| 2-Pyrrolidone | 3.5 g |
| Glycerin | 11.8 g |
| Triethanolamine | 0.5 g |
| Proxel XL II | 1.0 g |
| Olfin E1010 | 1.0 g |

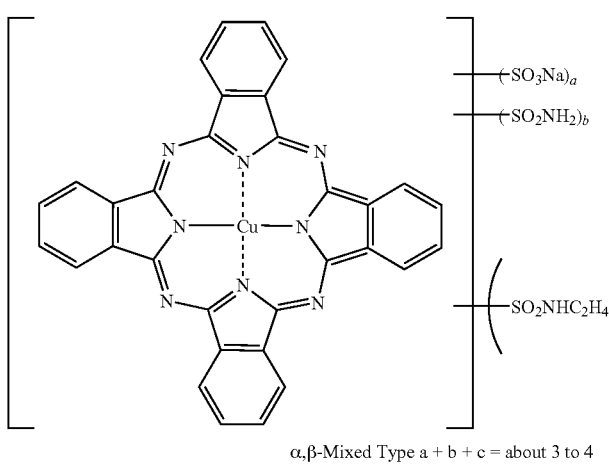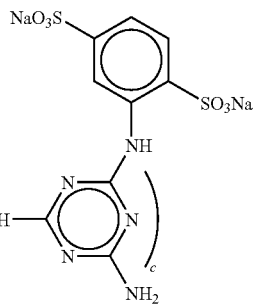

Dye a

α,β-Mixed Type a + b + c = about 3 to 4

(Ink C-2)
Ink C-2 is prepared in the same manner as Ink C-1 except for replacing 5.7 g of water in Ink C-1 with 5.7 g of a 17.5 wt % aqueous solution of Compound P-3.

(Ink C-3)
Ink C-3 is prepared in the same manner as Ink C-1 except for replacing 1.0 g of water in Ink C-1 with 1.0 g of aminoguanidine hydrochloride.

(Ink C-4)
Ink C-4 is prepared in the same manner as Ink C-1 except for replacing 6.7 g of water in Ink C-1 with 5.7 g of a 17.5 wt % aqueous solution of Compound P-3 and 1.0 g of aminoguanidine hydrochloride.

(Ink C-5)
Ink C-5 is prepared in the same manner as Ink C-4 except for replacing Dye a in Ink C-4 with Dye 111.

(Ink C-6)
Ink C-6 is prepared in the same manner as Ink C-4 except for replacing Dye a in Ink C-4 with Dye 108.

(Ink C-7)
Ink C-7 is prepared in the same manner as Ink C-4 except for replacing Dye a in Ink C-4 with Dye 114.

(Ink C-8)
Ink C-8 is prepared in the same manner as Ink C-5 except for replacing 1.0 g of aminoguanidine hydrochloride in Ink C-5 with 1.0 g of guanidine hydrochloride.

(Ink C-9)
Ink C-9 is prepared in the same manner as Ink C-5 except for replacing 1.0 g of aminoguanidine hydrochloride in Ink C-5 with N,N'-diaminoguanidine.

(Ink C-10)
Ink C-10 is prepared in the same manner as Ink C-1 except for replacing 7.7 g of water in Ink C-1 with 5.7 g of a 17.5 wt % aqueous solution of Compound P-3 and 2.0 g of aminoguanidine hydrochloride and replacing Dye a with Dye 111.

(Ink C-11)
Ink C-11 is prepared in the same manner as Ink C-1 except for replacing 12.4 g of water in Ink C-1 with 11.4 g of a 17.5 wt % aqueous solution of Compound P-3 and 1.0 g of aminoguanidine hydrochloride and replacing Dye a with Dye 111.

(Inkjet Recording)
Inks C-1 to C-11 prepared above each is filled in a cyan ink cartridge of an inkjet printer, PM-A-700, manufactured by Seiko Epson Corp., and an image is printed on photographic paper, Crispia <KO-KOTAKU>, produced by Seiko Epson Corp. and subjected to various evaluations.

(Evaluation of Ozone Resistance)
A monochromatic step patch image is printed. When 24 hours is passed after printing of this step patch image, the reflection density (Ci) in each concentration region of the step patch portion is measured using an X-rite 310 densitometer including a Status A Filter as standard equipment. Subsequently, a discoloration test is performed by storing this sample in an ozone fadeometer at an ozone concentration of 5 ppm for 3 days. A commercially available apparatus of high-pressure charging type, to which an AC voltage of 5 kV is applied, is used as the ozonizer, and the ozone gas concentration is set and controlled using an ozone gas monitor (Model OZG-EM-01) manufactured by APPLICS.

After storage for 3 days, the image density is again measured to determine the density (Cf) after storage, and the residual coloring matter ratio [%]=(Cf/Ci)×100 is obtained to evaluate the ozone resistance. A value at a reflection density Ci of 0.9 to 1.1 is employed as the residual coloring matter ratio.

The samples are rated on a five-stage scale, namely, rated A when the residual coloring matter ratio is 85% or more, rated B when from 80% to less than 85%, rated C when from 75% to less than 80%, rated D when from 70% to less than 75%, and rated E when less than 70%.

(Generation of Bronze Gloss)
The cyan Dmax part after printing in an environment of 30° C. and 80% RH is observed with an eye to confirm whether bronze is generated or not.

TABLE 5

|  | Ozone Resistance | Bronze |
| --- | --- | --- |
| Ink C-1 (Comparative Example) | D | generated |
| Ink C-2 (Comparative Example) | D | none |
| Ink C-3 (Comparative Example) | C | generated |

TABLE 5-continued

|  | Ozone Resistance | Bronze |
|---|---|---|
| Ink C-4 (Invention) | B | none |
| Ink C-5 (Invention) | A | none |
| Ink C-6 (Invention) | A | none |
| Ink C-7 (Invention) | A | none |
| Ink C-8 (Invention) | A | none |
| Ink C-9 (Invention) | A | none |
| Ink C-10 (Invention) | A | none |
| Ink C-11 (Invention) | A | none |

Even when the image-receiving paper for use in the present invention is changed to Inkjet Photo Gloss Paper "GASAI" produced by Fuji Photo Film Co., Ltd. or PR101 produced by Canon Inc., the same effects as in the results above are obtained.

Industrial Applicability

According to the present invention, an inkjet recording ink capable of forming a color image excellent in the color reproduction, assured of sufficiently high fastness to light, heat, humidity and active gas in the environment and free from occurrence of a bronze phenomenon can be provided. Furthermore, an inkjet recording method satisfying both the improvement of bronze phenomenon of the recorded image and the improvement of preservability of the recorded image at the same time in a high improvement level, and a method for preventing the occurrence of a bronze phenomenon of an image and improving the preservability of an image can be provided.

The entire disclosure of each and every foreign patent application from which the benefit of foreign priority has been claimed in the present application is incorporated herein by reference, as if fully set forth.

The invention claimed is:
1. An ink composition comprising:
a colorant represented by the following formula (I);
water;
a guanidine-based compound; and
a colorless water-soluble planar compound having more than ten delocalized π-electrons within one molecule:

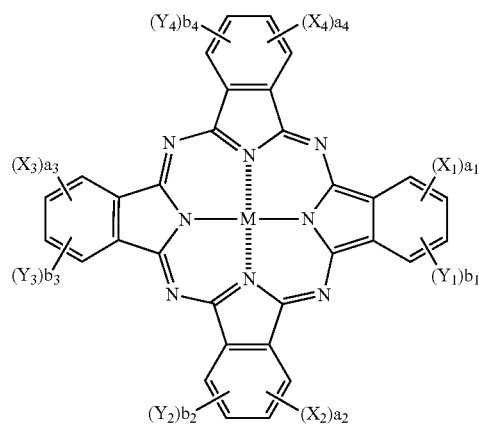

Formula (I)

wherein
M represents a hydrogen atom, a metal atom, an oxide thereof, a hydroxide thereof or a halide thereof;
each of $X_1$, $X_2$, $X_3$ and $X_4$ represents a substituent selected from the group consisting of —SO—$R_1$, —$SO_2$—$R_1$, —$SO_2NR_2R_3$, —$CONR_2R_3$, —$CO_2$—$R_1$, —CO—$R_1$, a sulfo group and a salt thereof, a carboxyl group and a salt thereof, and a phosphono group and a salt thereof;
$R_1$ represents a substituted or unsubstituted alkyl group, a substituted or unsubstituted aryl group, or a substituted or unsubstituted heterocyclic group;
$R_2$ represents a hydrogen atom, a substituted or unsubstituted alkyl group, a substituted or unsubstituted aryl group, or a substituted or unsubstituted heterocyclic group;
$R_3$ represents a hydrogen atom, a substituted or unsubstituted alkyl group, a substituted or unsubstituted aryl group, or a substituted or unsubstituted heterocyclic group;
each of $Y_1$, $Y_2$, $Y_3$ and $Y_4$ represents a hydrogen atom or a monovalent substituent which may further have a substituent; and
$a_1$ to $a_4$ and $b_1$ to $b_4$ represent the numbers of $X_1$ to $X_4$ and $Y_1$ to $Y_4$, respectively, and each of $a_1$ to $a_4$ and $b_1$ to $b_4$ represents an integer of 0 to 4,
provided that
at least one of $X_1$, $X_2$, $X_3$, $X_4$, $Y_1$, $Y_2$, $Y_3$ and $Y_4$ is itself an ionic hydrophilic group or has an ionic hydrophilic group as a substituent; and
at least one of $a_1$ to $a_4$ is not 0.
2. The ink composition according to claim 1, wherein the colorant represented by the formula (I) is represented by the following formula (II):

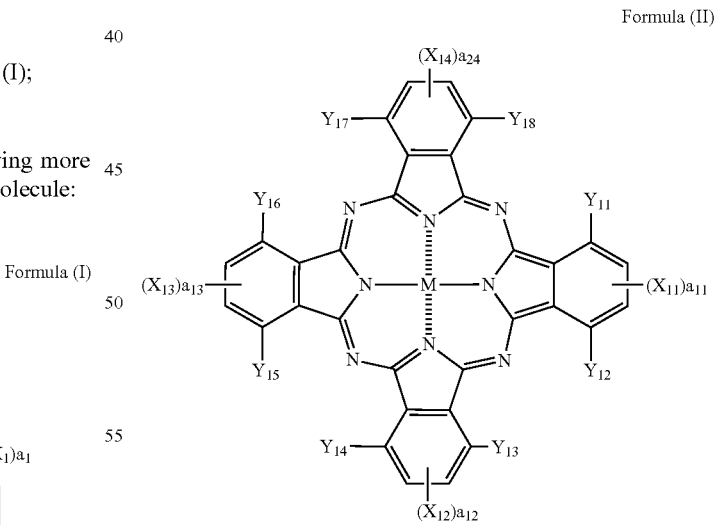

Formula (II)

wherein
M has the same meaning as M in the formula (I);
each of $X_{11}$, $X_{12}$, $X_{13}$ and $X_{14}$ represents a substituent selected from the group consisting of —$SO_2NR_2R_3$, —$CONR_2R_3$, —$CO_2$—$R_1$, —CO—$R_1$, a sulfo group and a salt thereof, a carboxyl group and a salt thereof, and a phosphono group and a salt thereof;

$R_1$, $R_2$ and $R_3$ have the same meaning as $R_1$, $R_2$ or $R_3$ in the formula (I), respectively;

each of $Y_{11}$, $Y_{12}$, $Y_{13}$, $Y_{14}$, $Y_{15}$, $Y_{16}$, $Y_{17}$ and $Y_{18}$ represents a hydrogen atom or a monovalent substituent which may further have a substituent; and $a_{11}$, $a_{12}$, $a_{13}$ and $a_{14}$ represent the numbers of $X_{11}$, $X_{12}$, $X_{13}$ and $X_{14}$, respectively, and each of $a_{11}$, $a_{12}$, $a_{13}$ and $a_{14}$ represents an integer of 0 to 2, provided that at least one of $X_{11}$, $X_{12}$, $X_{13}$, $X_{14}$, $Y_{11}$, $Y_{12}$, $Y_{13}$, $Y_{14}$, $Y_{15}$, $Y_{16}$, $Y_{17}$ and $Y_{18}$ is itself an ionic hydrophilic group or has an ionic hydrophilic group as a substituent; and at least one of $a_{11}$ to $a_{14}$ is not 0.

3. The ink composition according to claim 1, wherein the colorant represented by the formula (II) is represented by the following formula (III):

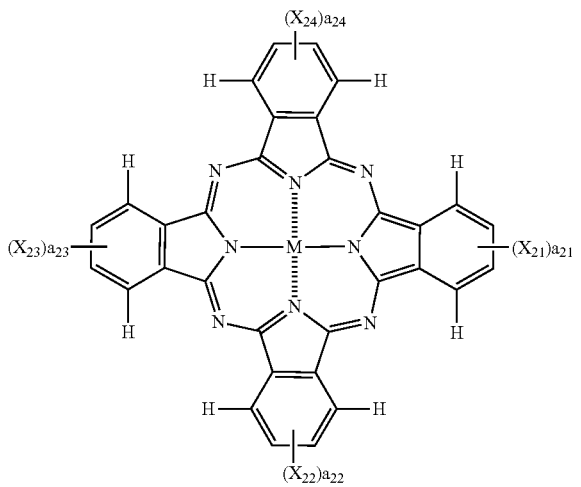

Formula (III)

wherein

M has the same meaning as M in the formula (II);

each of $X_{21}$, $X_{22}$, $X_{23}$ and $X_{24}$ represents a substituent selected from the group consisting of —$SO_2NR_2R_3$, —$CONR_2R_3$, —$CO_2$—$R_1$, —CO—$R_1$, a sulfo group and a salt thereof, a carboxyl group and a salt thereof, and a phosphono group and a salt thereof;

$R_1$, $R_2$ and $R_3$ have the same meaning as $R_1$, $R_2$ or $R_3$ in the formula (II) respectively; and $a_{21}$, $a_{22}$, $a_{23}$ and $a_{24}$ represent the numbers of $X_{21}$, $X_{22}$, $X_{23}$ and $X_{24}$, respectively, and each of $a_{21}$, $a_{22}$, $a_{23}$ and $a_{24}$ represents an integer of 0 to 2, provided that at least one of $X_{21}$, $X_{22}$, $X_{23}$ and $X_{24}$ is itself an ionic hydrophilic group or has an ionic hydrophilic group as a substituent; and at least one of $a_{21}$ to $a_{24}$ is not 0.

4. The ink composition according to claim 1, wherein the colorant represented by the formula (III) is represented by the following formula (IV):

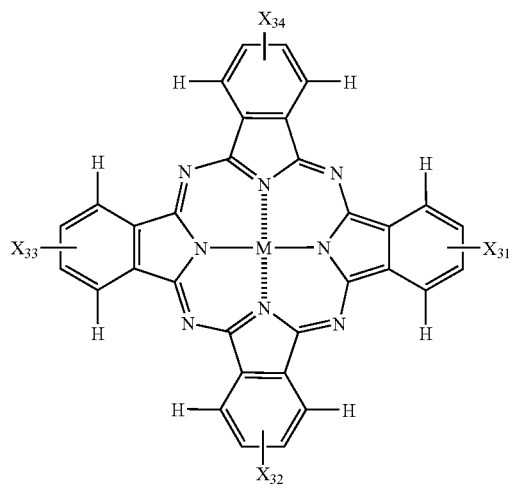

Formula (IV)

wherein

M has the same meaning as M in the formula (III);

each of $X_{31}$, $X_{32}$, $X_{33}$ and $X_{34}$ represents a substituent selected from the group consisting of —$SO_2NR_2R_3$, —$CONR_2R_3$, —$CO_2$—$R_1$, —CO—$R_1$, a sulfo group and a salt thereof, a carboxyl group and a salt thereof, and a phosphono group and a salt thereof; and $R_1$, $R_2$ and $R_3$ have the same meaning as $R_1$, $R_2$ or $R_3$ in the formula (II), provided that at least one of $X_{31}$, $X_{32}$, $X_{33}$ and $X_{34}$ is itself an ionic hydrophilic group or has an ionic hydrophilic group as a substituent.

5. The ink composition according to claim 4, wherein each of $X_{31}$, $X_{32}$, $X_{33}$ and $X_{34}$ each independently represents a substituent selected from the group consisting of —$SO_2NH_2$, —$SO_2NR_2R_3$, a sulfo group and a salt thereof, provided, that at least one of $R_2$ and $R_3$ is not a hydrogen atom.

6. The ink composition according to claim 4, wherein at least one of $X_{31}$, $X_{32}$, $X_{33}$ and $X_{34}$ is —$SO_2NH_2$; and at least one of $X_{31}$, $X_{32}$, $X_{33}$ and $X_{34}$ is —$SO_2NR_2R_3$, provided that at least one of $R_2$ and $R_3$ is not a hydrogen atom.

7. The ink composition according to claim 4, wherein at least one of $X_{31}$, $X_{32}$, $X_{33}$ and $X_{34}$ is —$SO_2NH_2$; at least one of $X_{31}$, $X_{32}$, $X_{33}$ and $X_{34}$ is —$SO_2NR_2R_3$; and at least one of $X_{31}$, $X_{32}$, $X_{33}$ and $X_{34}$ is a sulfo group or a salt thereof, provided that at least one of $R_2$ and $R_3$ is not a hydrogen atom.

8. The ink composition according to claim 1, wherein at least one ionic hydrophilic group in the colorant represented by the formula (I) is a sulfo group or a salt thereof.

9. The ink composition according to claim 1, wherein at least one ionic hydrophilic group in the colorant represented by the formula (I) is a lithium salt of sulfo group, provided that all counter cations of the salts of sulfo group are not necessarily a lithium ion.

10. The ink composition according to claim 1, wherein 50% or more of counter cations of all the ionic hydrophilic groups in the colorant represented by the formula (I) are a lithium cation.

11. The ink composition according to claim 1, wherein 50% or more of all the ionic hydrophilic groups in the colorant represented by formula (I) are a lithium salt of sulfo group,
provided that all counter cations of the salts of sulfo group are not necessarily a lithium ion.

12. The ink composition according to claim 1, further comprising:
at least one phthalocyanine dye represented by the following formula (V):

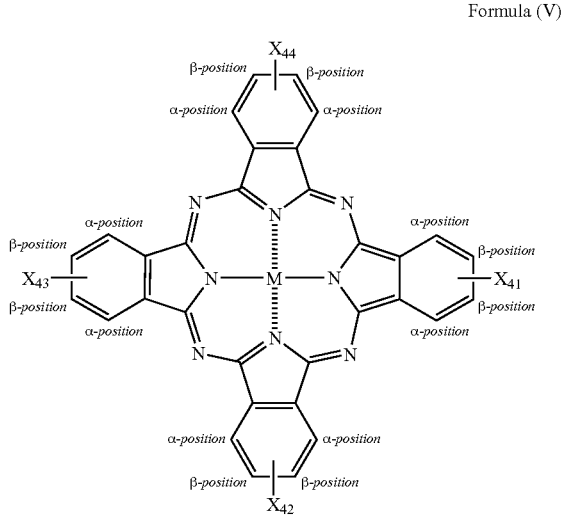

Formula (V)

wherein
M has the same meaning as M in the formula (I);
each of $X_{41}$, $X_{42}$, $X_{43}$ and $X_{44}$ represents a substituent selected from the group consisting of —$SO_2NR_2R_3$, —$CONR_2R_3$, —$CO_2$—$R_1$, —CO—$R_1$, a sulfo group and a salt thereof, a carboxyl group and a salt thereof, and a phosphono group and a salt thereof; and
$R_1$, $R_2$ and $R_3$ have the same meaning as $R_1$, $R_2$ or $R_3$ in the formula (I), respectively,
provided that at least one of $X_{41}$, $X_{42}$, $X_{43}$ and $X_{44}$ is itself an ionic hydrophilic group or has an ionic hydrophilic group as a substituent.

13. The ink composition according to claim 12, wherein
at least one of $X_{41}$, $X_{42}$, $X_{43}$ and $X_{44}$ represents an —$SO_2NH_2$ group;
at least one of $X_{41}$, $X_{42}$, $X_{43}$ and $X_{44}$ represents an —$SO_2NR_2R_3$ group; and
at least one of $X_{41}$, $X_{42}$, $X_{43}$ and $X_{44}$ represents a sulfo group or a salt thereof.

14. The ink composition according to claim 1, wherein the water-soluble planar compound has at least two aromatic rings.

15. The ink composition according to claim 1, wherein the water-soluble planar compound has no fluorescence, and has 350 nm or less of λmax and 10,000 or less of molar absorption coefficient, wherein
λmax represents a wavelength of the absorption peak having the longest wavelength.

16. The ink composition according to claim 1, wherein the water-soluble planar compound has a sulfo group.

17. The ink composition according to claim 1, wherein the guanidine-based compound is represented by the following formula (1):

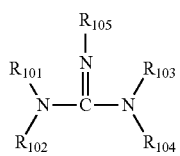

Formula (1)

$R_{101}$, $R_{102}$, $R_{103}$ and $R_{104}$ each independently represents a hydrogen atom, a substituted or unsubstituted alkyl group, a substituted or unsubstituted alkoxy group, a substituted or unsubstituted aryl group, a substituted or unsubstituted heterocyclic group, or substituted or unsubstituted an amino group; and
$R_{105}$ represents a hydrogen atom, a substituted or unsubstituted alkyl group, a substituted or unsubstituted alkoxy group, a substituted or unsubstituted aryl group, or a substituted or unsubstituted heterocyclic group.

18. The ink composition according to claim 1, wherein the guanidine-based compound is in an amount of 0.1 to 10 mass % based on the ink composition.

19. The ink composition according to claim 1, further comprising:
a surfactant.

20. The ink composition according to claim 19, wherein the surfactant is in an amount of 0.05 to 50 g/liter based on the ink composition.

21. The ink composition according to claim 19, wherein the surfactant is a nonionic surfactant.

22. The ink composition according to claim 21, wherein the nonionic surfactant is an acetylene glycol-based surfactant.

23. The ink composition according to claim 1, further comprising:
an antiseptic.

24. An inkjet recording ink prepared by utilizing the ink composition according to claim 1.

25. An inkjet recording method utilizing the inkjet recording ink according to claim 24.

* * * * *